United States Patent [19]

Anderson et al.

[11] Patent Number: 5,448,735

[45] Date of Patent: Sep. 5, 1995

[54] TASK ORGANIZATION FOR EXECUTION USING LINKED RECORDS REFERENCING CODE MODULES

[75] Inventors: Eric C. Anderson, San Jose, Calif.; Hugh B. Svendsen, Atlanta, Ga.

[73] Assignee: Apple Computer, Inc., Cupertino, Calif.

[21] Appl. No.: 369,307

[22] Filed: Jan. 6, 1995

Related U.S. Application Data

[63] Continuation of Ser. No. 954,988, Sep. 30, 1992, abandoned.

[51] Int. Cl.⁶ .............................................. G06F 9/00
[52] U.S. Cl. ............................ 395/650; 364/DIG. 1; 364/280; 364/281.3; 364/281.4; 364/281.7; 364/281.8
[58] Field of Search ............. 395/650; 364/280, 281.3, 364/281.4, 281.7, 281.8

[56] References Cited

U.S. PATENT DOCUMENTS

| | | | |
|---|---|---|---|
| 4,229,790 | 10/1980 | Gilliland et al. | 364/200 |
| 4,507,752 | 3/1985 | McKenna et al. | 364/960 |
| 4,864,492 | 9/1989 | Lowry et al. | 364/300 |
| 5,193,186 | 3/1993 | Tamaki et al. | 395/650 |
| 5,247,658 | 9/1993 | Barrett et al. | 395/600 |

*Primary Examiner*—Kevin A. Kriess
*Assistant Examiner*—Jonathan Hall Backenstose
*Attorney, Agent, or Firm*—Blakely, Sokoloff, Taylor & Zafman

[57] ABSTRACT

An apparatus and method of grouping tasks for execution by a processor, such as a digital signal processor. At least one task datum, is created the task datum including an identifier of a first task, and a reference to a next task datum. The task datum is placed into a task list which may contain references to any number of tasks. A reference is created to a first module datum in the task datum, the first module datum representing a first executable module of the first task. The first module datum is linked with any number of modules having functions related to the first executable module. By grouping the related modules which form a task together, error conditions, and data for each of the tasks and modules may be handled more efficiently. Modules may reference common storage areas they require so that unnecessary loading/saving of data in those common storage areas may be avoided.

18 Claims, 18 Drawing Sheets

Figure 12 - "PhoneMan" Task (Phone Answering Machine)

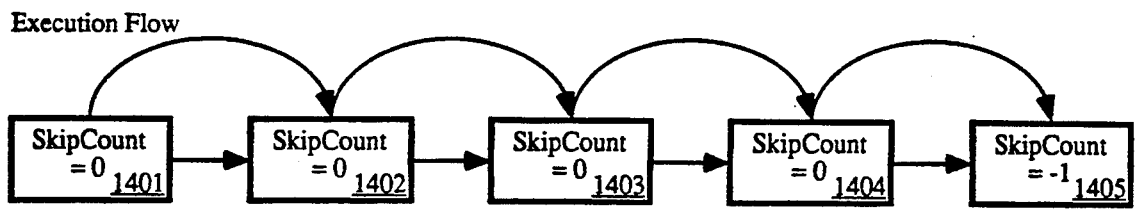
Figure 14a - Execution Path: 1401, 1402, 1403, 1404, 1405
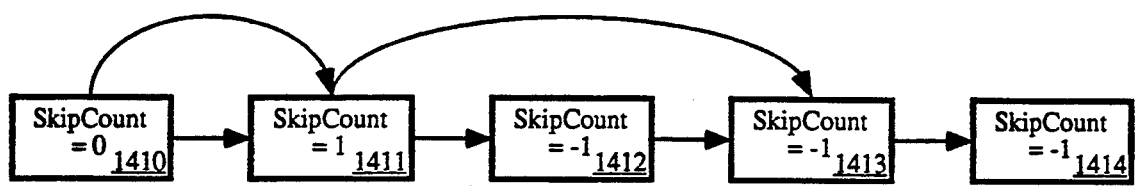
Figure 14b - Execution Path: 1410, 1411, 1413
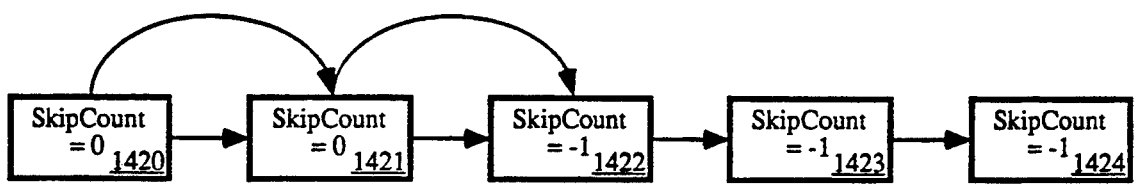
Figure 14c - Execution Path: 1420, 1421, 1422
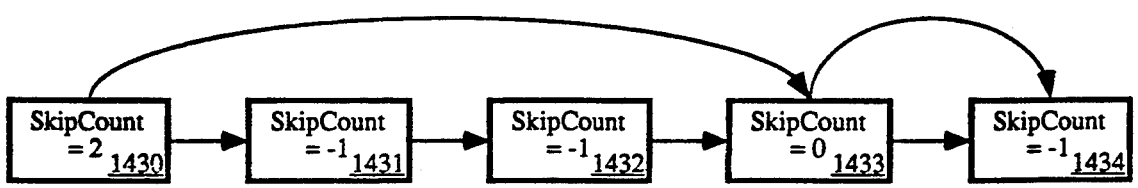
Figure 14d - Execution Path: 1430, 1433, 1434

TASK ORGANIZATION FOR EXECUTION USING LINKED RECORDS REFERENCING CODE MODULES

This is a continuation of application Ser. No. 07/954,988, filed Sep. 30, 1992, now abandoned.

BACKGROUND OF THE INVENTION

1. Field of the Invention

The present invention relates to processors in computer systems. Specifically, the present invention relates to task management in a processor.

2. Background Information

Modem applications, such as multimedia applications where text, audio, speech, video, and data communications are all processed in real-time, have special requirements. Standard commercially available microcomputers have typically not had the requisite processing power in order to perform all these tasks in a real-time environment. Modern architectures which are designed to handle the load associated with operating these types of tasks in real-time has sometimes dictated the use of a digital signal processor (DSP). However, even when using a digital signal processor, tasks consuming a lot of processing bandwidth still need to be managed in an efficient way in order for all the requisite processing to be done within specific intervals of time.

One approach to task management for processes which need to be completed in a specified interval of time is to divide time into a discrete series of units known as "frames." Frames are intervals of time in which an interrupt or other timing signal is generated to a processor at regular intervals and each of the tasks being executed by the processor is serviced in sequence. In such a frame-based processing system, each of the tasks is typically linked or associated with one another through some data structure, and the data structure is traversed during the servicing of the interrupt at the beginning of the frame, such that each task is serviced within the frame. A frame length is typically chosen based upon available cache memory in the system, and the minimum possible rate at which specific tasks should be serviced, among other considerations. For instance, a MIDI application (one using the Musical Instrument Digital Interface) requires minimum frame duration of 2 to 4 milliseconds. Applications using the V.32 data modem requires a maximum frame limit of 13 milliseconds. At any rate, frame size is typically driven by the application, available hardware, and other factors.

One prior art technique for organizing tasks is to place them in a simple, linear list. In this approach, each task is executed in turn. One shortcoming of this approach is that tasks which are related to one another are not logically grouped. In addition, this prior an approach suffers from the defect that there is no distinction between tasks which require servicing at regular intervals and those which require servicing only occasionally. Therefore, overall execution time of the processor may be hampered (and certain applications hindered, or not able to run at all) by executing both types of tasks without regard for the tasks' timing requirements. In addition, because each of the tasks are linked sequentially, resource allocation may not be done optimally according to a function's activity which comprises one or more tasks. For instance, certain of the tasks linked sequentially may be related and thus unnecessary or inefficient resource allocation for each of the tasks may be performed. This occurs because memory accesses and other types of resource accessing may be done repetitively according to where in the execution list the related tasks appear.

Yet another shortcoming of the prior art organization of tasks is that error conditions which are generated on one task may or may not necessarily abort other dependent tasks. As a result, the application programmer needs to include in each of his tasks error handling routines which will determine whether a previous task on which it is dependent has completed normally. This will prevent the execution of the task because it will not function properly in the absence of the previous task completing normally. This requires extra work for the programmer, plus extra overhead for the processing system. In general, client or process management of tasks is difficult using the prior art sequential method of task servicing and execution.

The prior art sequential task execution list also fails to provide a means for performing certain groups of tasks in different sequences. Certain tasks may be run unnecessarily even where a prior control task has ascertained that only limited number of related tasks need to be executed. Of course, each task will also require execution control code in order to determine whether the task will be run or not. Again, needless overhead is consumed by calling each task for execution, even if not required, due to loading and saving the processor context and retrieving the requested resources from memory or non-volatile storage. This requires that the programmer has a more in-depth knowledge of the underlying operating system and its organization of functions, as well as adds additional complexity to each of the tasks which are linked.

Yet another shortcoming of the prior art approach of sequentially linking tasks in a task list is that the organization provides no means to manage the processing load for a group of tasks which are required to be run in a specific interval of real-time, where different combinations of the tasks are required depending on the status of the function Such a means is important in order to guarantee that each of the functions comprised by one or more tasks is serviced during a frame. This results in difficulty in managing real-time resources, and may cause the failure of a real-time process due to incorrectly determining the required execution load.

SUMMARY AND OBJECTS OF THE INVENTION

One of the objects of the present invention is to provide an efficient means for task organization which groups tasks by function.

Another of the objects of the present invention is to provide a means for organizing tasks such that error conditions and other status information may be maintained easily among groups of tasks.

Another of the objects of the present invention is to provide a means for flow control within a task such that resources are not needlessly consumed when certain subtasks or modules are not required to be performed.

Another of the objects of the present invention is to provide a means for facilitating the efficient use of processing power for all types of tasks.

Another of the objects of the present invention is to provide a means for synchronizing the execution of various tasks within specific intervals of time.

These and other objects of the present invention are provided for by a means and method of grouping tasks for execution by a processor, such as a digital signal processor. The method creates at least one task datum, the task datum including an identifier of a first task, and a reference to a next task datum. The task datum is placed into a task list which may contain references to any number of tasks. A reference is created to a first module datum in the task datum, the first module datum representing a first executable module of the first task. The first module datum is linked with a second module datum, if any, for a second executable module having functions related to the first executable module. Any number of related modules may be linked with the first module datum. By grouping the related modules which form a task together, error conditions, and resource requirements for each of the tasks and modules may be handled more efficiently. For example, in one embodiment, modules may reference common storage areas they require such as sections so that unnecessary loading/saving of data in common storage areas may be avoided.

BRIEF DESCRIPTION OF THE DRAWINGS

The present invention is illustrated by way of example and not limitation of the figures of the accompanying in which like references indicate like elements and in which:

FIGS. 14a through 14d show various examples of using the method of task flow execution described in FIG. 13 above.

DETAILED DESCRIPTION

This application is related to the following co-pending patent applications filed concurrently herewith:.

A patent application entitled INTERTASK BUFFER AND CONNECTIONS, whose inventors are A. Philip Sohn and Eric Anderson, which has been assigned Ser. No. 07/954,902.

A patent application entitled A METHOD AND MEANS FOR PROVIDING MULTIPLE CLIENTS SIMULTANEOUS ACCESS TO A SOUND DATA STREAM, whose inventors are Eric Anderson and Hugh Svendsen, which has been assigned Ser. No. 07/954,873.

A patent application entitled APPARATUS AND METHOD FOR HANDLING FRAME OVER-RUNS IN A DIGITAL SIGNAL PROCESSING SYSTEM, whose inventors are Eric Anderson and Hugh Svendsen, which has been assigned Ser. No. 07/954,758.

A patent application entitled APPARATUS AND METHOD FOR ALLOCATING PROCESSING TIME IN A FRAME-BASED COMPUTER SYSTEM, whose inventors are Eric Anderson and A. Philip Sohn, which has been assigned Ser. No. 07/054,338.

A patent application entitled EXECUTION CONTROL FOR PROCESSOR TASKS, whose inventors are Eric Anderson and Hugh B. Svendsen, which has been assigned Ser. No. 07/954,770.

A method and apparatus of task management in a processor is described. In the following description, for the purposes of explanation, specific data structures, pointers, resources, times, signals, and formats are set forth in order to provide a thorough understanding of the present invention. It will be apparent, however, to one skilled in the art that the present invention may be practiced without these specific details. In other instances, well-known structures and devices are shown in block diagram form in order to not unnecessarily obscure the present invention.

Overview of a Computer System Used In a Preferred Embodiment

Figure 1:
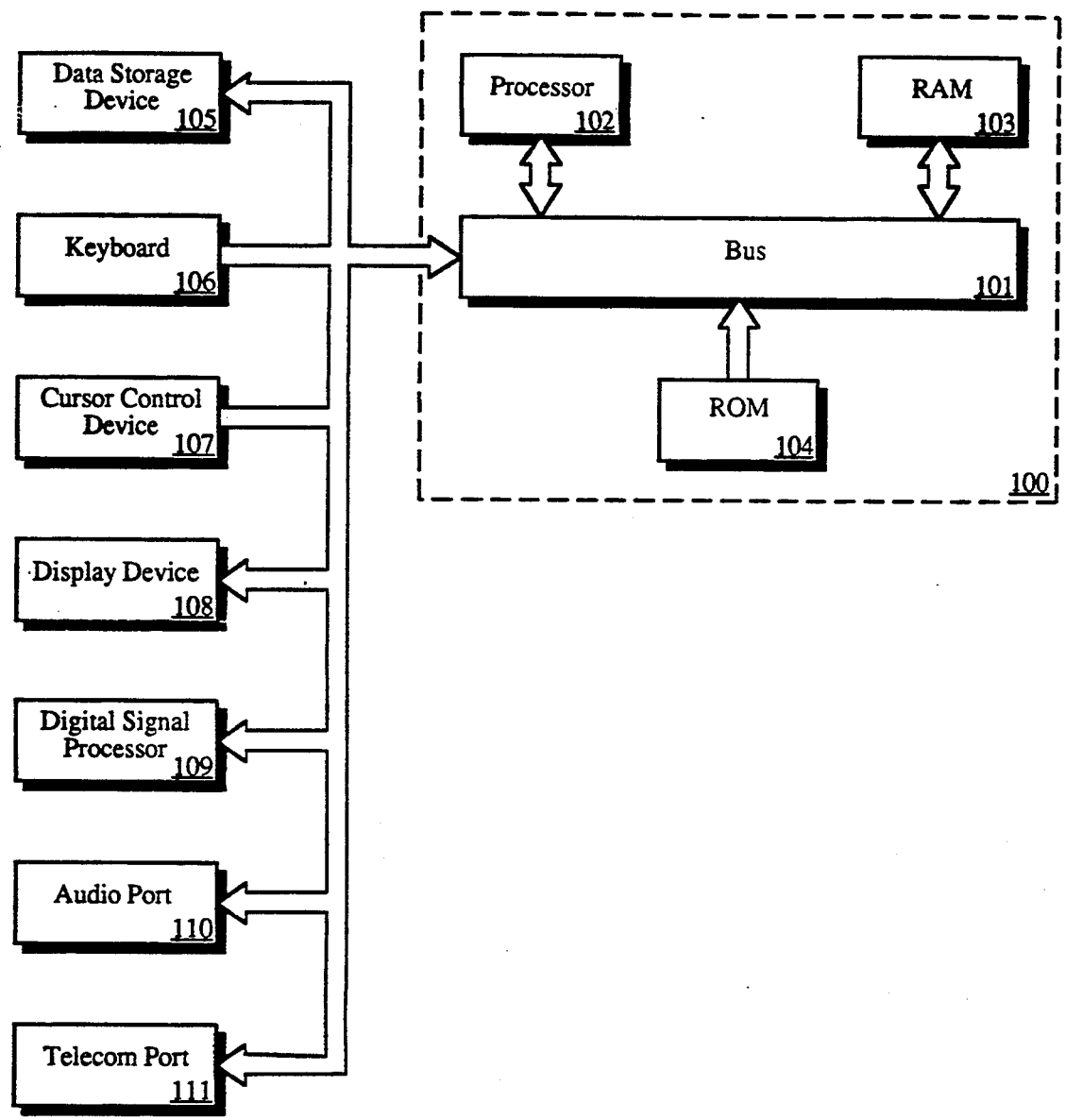
FIG. 1 is a block diagram of the computer system which may be utilized by the preferred embodiment of the present invention.

The preferred embodiment of the present invention may be practiced on computer systems having alternative configurations. FIG. 1 illustrates some of the basic components of such a computer system, but is not meant to be limiting nor to exclude other components or combinations of components. Computer system 100 illustrated in FIG. 1 comprises a bus or other communication means 101 for communicating information, a processing means 102 (commonly referred to as a host processor) coupled with bus 101 for processing information, a random access memory (RAM) or other storage device 103 (commonly referred to as a main memory) coupled with bus 101 for storing information and instructions for the processor 102, a read only memory (ROM) or other static storage device 104 coupled with the bus 101 for storing static information and instructions for the processor 102.

Other devices coupled to bus 101 include a data storage device 105, such as a magnetic disk and disk drive for storing information and instructions, an alpha numeric input device 106, including alpha numeric and other keys, for communicating information and command selections to processor 102, a cursor control device 107, such as a mouse, track-ball, cursor control keys, etc., for controlling a cursor and communicating information and command selections to the processor 102, a display device 108 for displaying data input and output, a digital signal processor (DSP) or other high speed processor 109 for processing DSP resource requests, an audio port 110 for input and output of audio signals and a telecommunications port 111 for input and output of telecommunication signals. In such a computer system configuration, the digital signal processor 109 is considered a coprocessor to the host processor 102. Computer system 100 is used for storing information and instructions, such instructions being executed by processor 102 during run time, wherein the storage of such information is in memory devices 103 and 104 and in data storage device 105 such as a magnetic disk and corresponding disk drive. Such instructions and information are stored in an electronic form on data storage device 105 and are converted to a series of electrical impulses when read from the data storage device 105 and which may be stored in digital form in RAM 103 for accessing by processor 102 during computer system run time. This series of electrical impulses in RAM 103 may represent the task and module data structures to be described in more detail below.

Architecturally, a DSP is a very fast integer Reduced Instruction Set Computer (RISC) based general purpose microprocessor which includes a pipelined arithmetic processing unit. A fundamental difference from true general purpose processors is that a DSP is designed to perform a multiply and accumulate (MAC) operation very quickly. The MAC operation is heavily used in DSP programs. It should be noted that DSP host applications may be written that do not require DSP coprocessor 109 for execution, but would exploit them if available. An embodiment of the present invention is implemented for use on some of the members of the family of Macintosh ® brand computers, available from Apple Computer, Inc. of Cupertino, Calif. (Macintosh ® is a registered trademark of Apple Computer, Inc.). A coprocessor 109 that may be utilized is any digital signal processor having operating characteristics and functions similar to those found in DSP 3210 Digital Signal Processor, available from American Telephone and Telegraph (AT&T) Microelectronics of Allentown, Pa.

Operating System Organization

Figure 2:
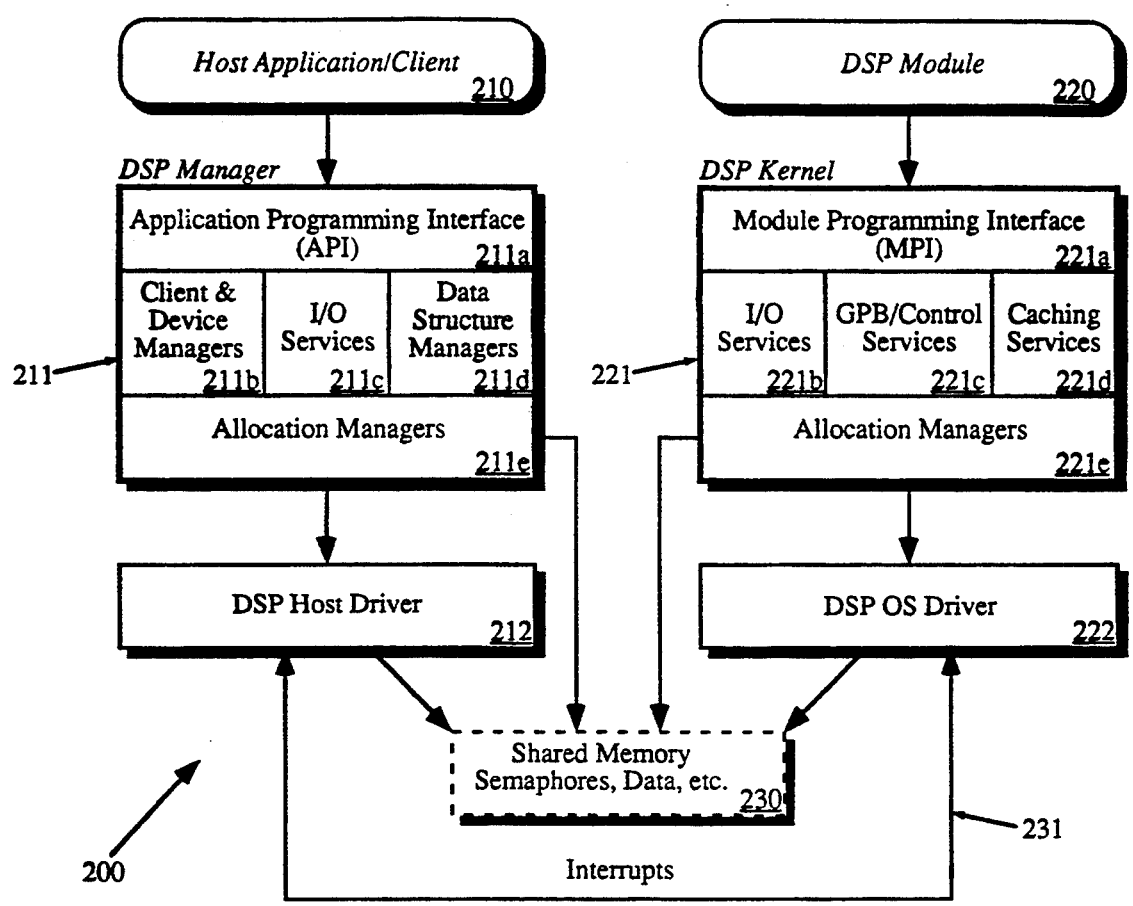
FIG. 2 illustrates the structure of an operating system which is used for managing tasks and clients using a coprocessor, such as a DSP.

The operating system organization of this embodiment is separated into two distinct halves for the two processors operating in the computer system. Referring to FIG. 2, host applications/clients 210 are handled by a DSP Manager 211 which operates in the host processor to direct and spawn tasks which are to be run in the DSP. In contrast, DSP modules or tasks 220 (which are spawned by DSP Manager 211 in the host processor) are operated from within a DSP Kernel 221 which operates within processor 109. In short, there are two distinct levels of computer programs which are used for operation in the preferred embodiment:

(1) Client (application or higher level toolbox) software programs which are executed on the host processor; and (2) DSP programs known as "modules" which run in DSP 109 (FIG. 1).

Therefore, programs may be written for DSP 109 and host 102 separately. For instance, library routines may be generated for operation in DSP 109, and those routines may be available to host-client programmers for reference during execution. Interprocess communication between DSP Manager 211 in host processor 102 and the DSP is provided by the DSP Kernel operating in DSP 109 (FIG. 1) and is provided through shared memory 230. Shared memory space 230 may be coupled to bus 101 or can be part of system RAM 103.

Shared memory 230 contains semaphores, data, messages, and other information which are required for interprocess communication between the two processors 102 and 109. DSP Manager 221 is further coupled to a host driver 212 which provides various hardware implementation dependent functionality for the DSP Manager 211 and other functions which are directed to the DSP Kernel driver 222. Therefore, toolbox routines may be available to the application/client program 210 to direct various actions in the tools residing in the DSP Kernel driver 222. Interprocessor communication is provided through shared memory area 230, as well as by interrupt lines 231, which are activated when actions need to be taken by either DSP host driver 212 or DSP Kernel driver 222. It should be noted that the structure shown in FIG. 2 is not required for practicing the present invention and is set forth for illustration purposes only. It can be appreciated by one skilled in the art that many other structures of operating systems to provide interprocess communication may be used.

The DSP Manager 211 is available to the host application/client routines 210 through an interface known as the application programming interface (API). In the currently preferred embodiment, DSP Manager 211 performs three primary services which are accessible through the API. These three services are known as the client and device managers 211B, I/O services 211C, and data structure managers 211D. These various services make calls on allocation managers 211E at the lowest levels of the DSP Manager 211. The DSP Kernel 221 is similarly structured to DSP Manager in that it includes a module program interface (MPI) 221A which is accessible by the DSP modules 220 generated by DSP programmers. MPI 221A accesses services available to the DSP modules such as I/O services 221B, guaranteed processing bandwidth (GPB) and control services 221C, and caching services 221D. Underlying these functions is an executive layer 221E which is responsible for managing task sequence and frame handling functions. These kernel routines have access to the DSP Kernel driver 222 and, thus, have access to the shared memory areas 230, and interrupt lines 231. In addition, executive layers 221E also has access to the shared memory area 230 for communication of messages to and from the DSP Manager 211 residing in the host processor.

Data Structures Used in the Preferred Embodiment

The data structures utilized by the currently preferred embodiment of the present invention are referred to as "modules" and "tasks." A module is a data structure defined by the system and the DSP programmer which is designed to perform a predetermined function.

A DSP module always includes program code, but it may also include data, input and output buffers, and parameter blocks. The number of modules and their required resources are defined by the DSP programmer.

A task is a data structure containing a reference to a list of one or more modules. Thus, a DSP task comprises one or more DSP modules. The modules in a task are grouped in the appropriate order and with the appropriate input/output and buffer connections. Frequently, a DSP task contains only one DSP module. A task is activated or deactivated as a single unit. Tasks may be grouped together in order to perform a specific function. The group of sequentially ordered tasks is known as a task list. In essence, a task list is a data structure which references a series of executable modules (i.e., programs). Also, a set of tasks can be sequentially or simultaneously activated or deactivated. A task is installed and removed from the task list as a unit.

DSP modules are provided to an application programmer as a resource and loaded into a DSP task using DSP Manager 211. A task is constructed using a series of calls to DSP Manager 211. These calls create the task structure, load and connect modules in the desired arrangement, allocate the required memory, and install the completed task into a DSP task list. Each of the modules comprises a DSP module header containing pointer information and other information related to the data structure and a series of DSP sections which each point to various resources, including executable code required by the DSP module to perform its function.

Figure 3:
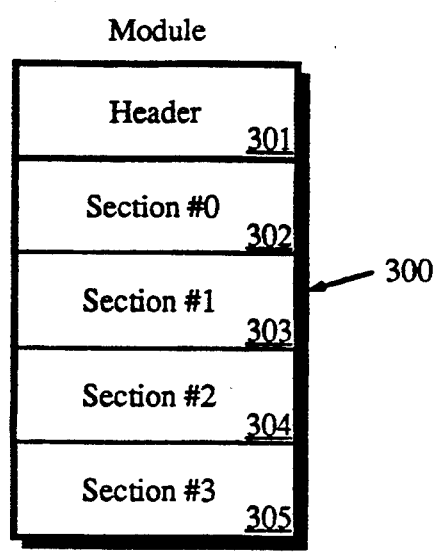
FIG. 3 illustrates the organization of data associated with each module in a task.

The currently preferred embodiment of module 300 is shown in FIG. 3. The internal structure of module 300 includes both code and data. Each module comprises a header and one or more sections. Header 301 contains information about the entire module such as its name, GPB information, and control flags. Header 301 also includes a count of the number of sections in the module. This allows module 300 to be of variable length, and the number of sections to be varied. Finally, header 301 contains the section number which contains the module startup code.

Module 300 shows sections 302–305. Sections allow modules to be created for a wide variety of functionality. In the currently preferred embodiment, each section has a name, pointer, flags, and a data type fields. In addition, each section contains pointers for up to two separate containers. Containers hold the data or code corresponding to the section. The sections can point to code, data tables, variables, buffers, parameters, work space, or any other resource needed to provide the desired function.

Figure 4:
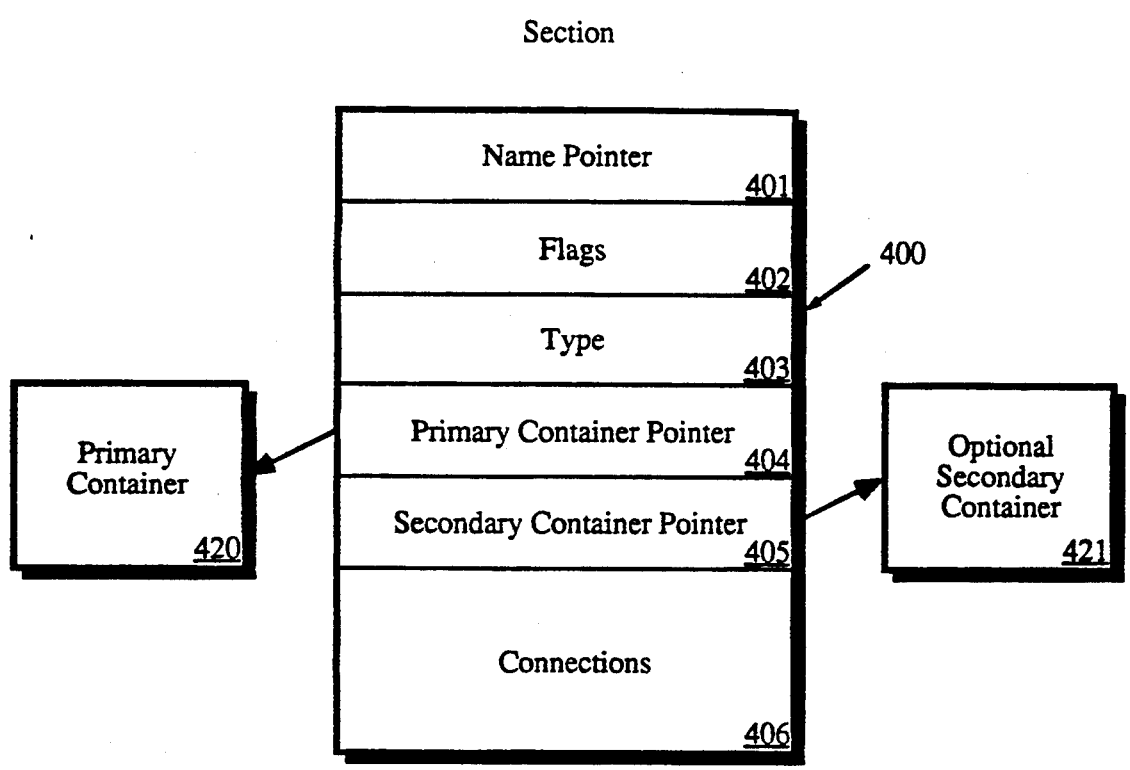
FIG. 4 illustrates the currently preferred embodiment of a section in a module in the present invention.

A section does not contain the actual code or data used by the DSP. Instead, a section is a data structure that contains pointers to the code or data block. The operating system of the DSP uses the section structure and flags to cache the actual code or data block into high speed cache memory during execution of the module. Referring to FIG. 4, section 400 comprises name pointer 401, flags 402, type 403, primary container pointer 404, secondary container pointer 405 and connections 406. Name pointer 401 points to a character string which uniquely identifies the section of a module. Flags 402 and type 403 are used by the preferred embodiment to control caching and manage buffers. Connections 406 is data that is used for buffer management internally to the DSP Manager and is discussed below.

Primary container pointer 404 points to the primary container 420, while secondary container pointer 405 points to the secondary container 421. In the currently preferred embodiment, primary container 420 and secondary container 421 are buffers. The DSP uses these pointers whenever it wants to locate the section data. Every section is normally required to have a primary container pointer 404, which can point to locations either on or off the DSP processor chip 109. The secondary container pointer 405 is optional. If a section has a secondary container pointer 405, then the primary container pointer 404 points to where the DSP user code will access the section and the secondary container pointer 405 points to where DSP operating system keeps the data between executions of the modules. Primary container 420 is allocated in local memory if it contains fixed data or parameters for communication between the host application and the module. Otherwise, primary container 420 is located in high speed cache (on-chip static RAM [SRAM] in the preferred embodiment) to increase execution performance. The secondary container 421 is usually allocated in local memory, but in special cases can be allocated in the cache. Allocated memory for each container must be in either local or cache memory.

To execute modules, each module is cached for access and execution by the DSP. The currently preferred embodiment of the present invention supports two separate execution models: AutoCache and DemandCache. In AutoCache, the programmer specifies which code and data blocks are to be loaded and saved. The DSP Kernel performs all load and save functions automatically. In DemandCache, the programmer explicitly moves code and data blocks on and off-chip, whenever needed, by making the appropriate calls to the DSP Kernel in the module DSP code.

During caching of an AutoCache module, code and data are loaded into the cache according to the section flags prior to its use and then data is saved back from the cache when execution is completed. In regards to primary container 420 and secondary container 421 during caching, the data is moved from secondary container 421 to primary container 420. In the currently preferred embodiment, this usually entails moving the contents from local memory to cache memory prior to module execution. This is commonly known as a cache load. After module execution, the DSP also moves data from the primary container 420 to secondary container 421. In the currently preferred embodiment, this entails moving the contents from cache memory to the local memory. This is commonly known as a cache save. When caching is not required, only one container is needed, the primary container 420. The use of containers provides communications between modules and the host application. This is usually through a shared memory area which either resides in host memory such as 103, or otherwise, is connected to a bus such as 101 shown in FIG. 1. The use of sections as disclosed herein provides unique capabilities wherein multiple modules, either provided off the shelf or written by a DSP programmer, may be modularized in such as way as to be joined together in a multiplicity of combinations. Application programmers may thereby create their own program without addressing the underlying functionality of DSP-specific modules. In addition, a variety of hardware platforms may be implemented with the section model providing compatibility with a variety of hardware platforms and future hardware advances.

Figure 5:
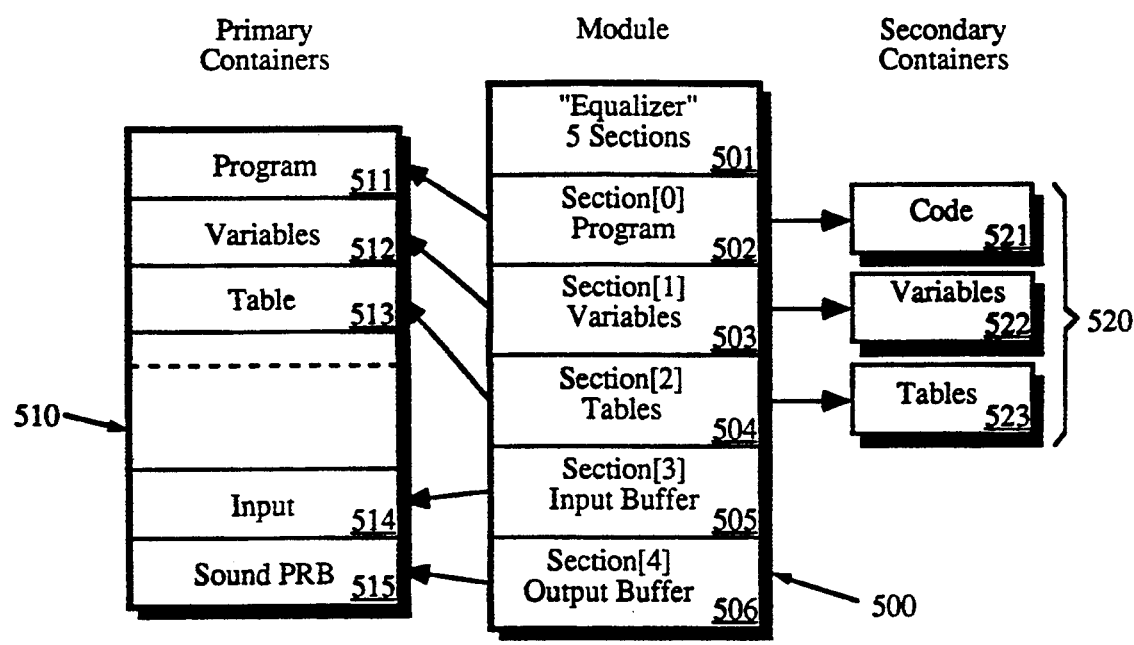
FIG. 5 illustrates an example of various resource references associated with a module of the present invention.

An example module with its primary and secondary containers is shown in FIG. 5. Module 500 is entitled "Equalizer" and contains five sections as indicated in header 501. Module 500 has program, variables and table section pointers 502, 503, and 504 pointing to primary container 510 containing program information 511, variable information 512, and table information 513. In addition, module 500 has an input and output buffer pointed to by 505 and 506 which point to input buffer 514 and sound output buffer 515. A caching function provided by the system in the preferred embodiment moves information between the secondary and primary containers prior to module execution and moves data between the primary and secondary containers after module execution. The secondary container 520 includes code 521, variables 522, and tables 523. Module and secondary containers are located in local RAM, and primary containers are located in the cache. In the example shown, code, variables, and table sections are loaded into the cache prior to executing the code section provided by module 500. After execution completes, only the variables are saved back to local memory.

To execute module 500, memory must be allocated. The allocation and memory management is accomplished in two phases. When the client loads module 500 into memory from a resource file, the DSP Manager allocates all the required blocks in local memory to hold the structure. For module 500, the DSP Manager allocates memory space for the module itself and the three secondary containers 521, 522 and 523. Containers 521, 522 and 523 are then loaded with data from the resource file to complete the first phase.

The client must also specify the I/O connections for module 500. The specifying of I/O connections is discussed below. The connections are made such that any memory allocation eliminates as much buffer movement as possible. If a buffer can be set and left in one place without being moved between execution of modules or tasks, the overhead for maintaining the buffer is also reduced. Besides specifying I/O connections, other modules may be loaded and connected together to form a multi-module task. Once completed, the DSP Manager calls one of the allocation managers to perform the cache allocation. Cache allocation by the allocation managers is the second phase of allocation. Once cache memory has been allocated to the task, it is ready for installation. For DemandCache, additional allocation is performed by the DSP Kernel at run-time.

The Overall Structure of Tasks

Figure 6:
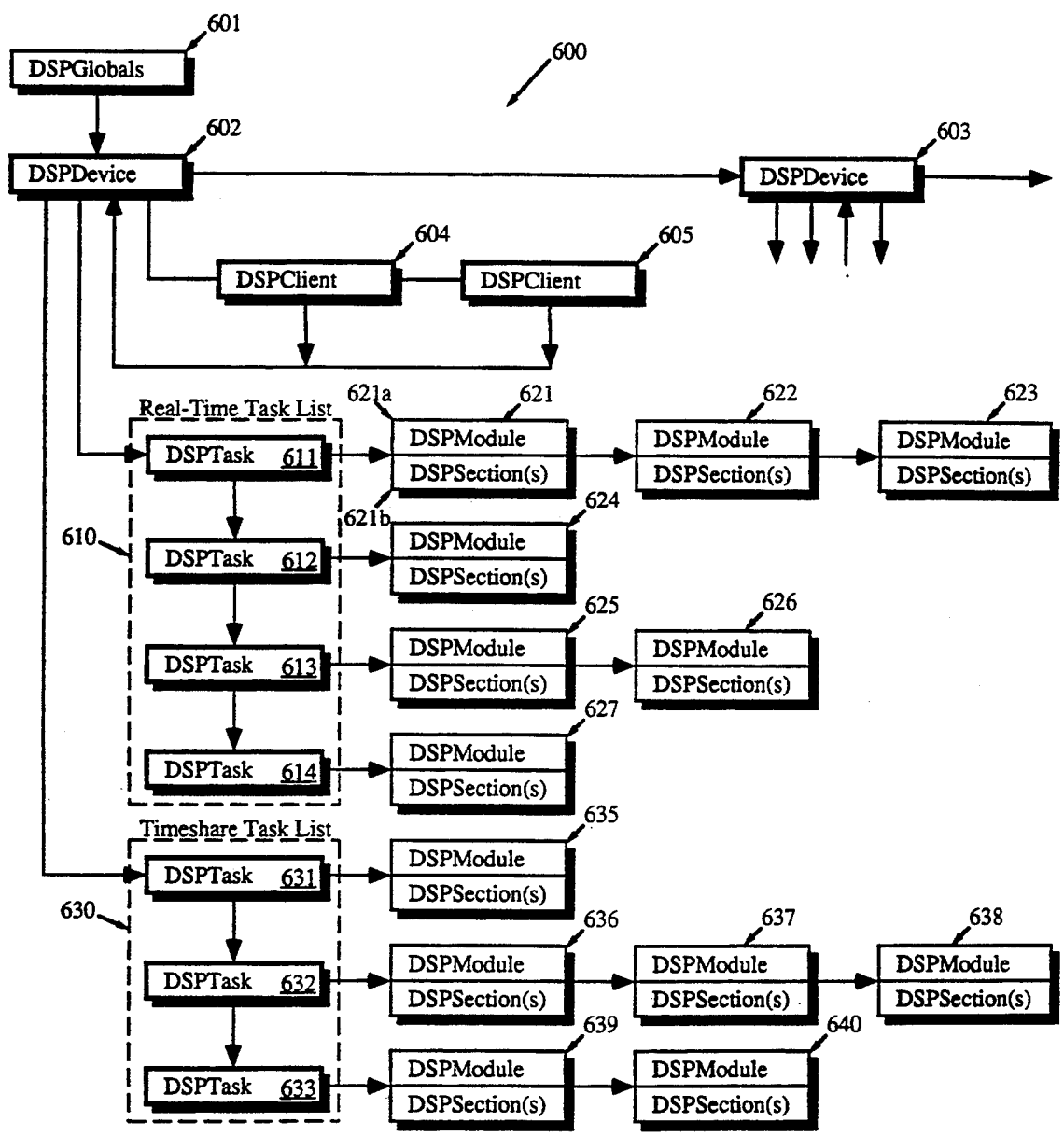
FIG. 6 illustrates the organization of tasks into a task list which may be performed in a DSP.

The overall structure of tasks to be executed in the preferred embodiment is shown with reference to structure 600 of FIG. 6. The system comprises a set of DSP globals 601 which maintains control and information regarding each of the DSP devices, such as 602 and 603, coupled in the system. Each DSP device, such as 602 and 603, may be one as shown as DSP 109 shown in FIG. 1. In this multiprocessing environment, a plurality of DSP devices may be used for certain tasks and/or capabilities in the system. Each of the DSP devices may be coupled to a bus 101 and reside on the main system logic board, or be coupled to the bus as expansion devices in the computer system. The detailed structure of only one DSP device 602 is shown for simplicity, however, DSP device 603 and subsequent devices coupled on a bus such as 101 may have a similar structure.

A DSP device, such as 602, handles a plurality of DSP clients, such as 604 and 605, wherein the client is either a system toolbox or an application that wishes to use a DSP 109. A DSP client is activated by "signing in" the client using a system call made through the DSP Manager 211. Client and device managers 211b are used to manage clients using DSP device 602. In this manner, each DSP device maintains information about the client as it relates to tasks that the client requires.

Each DSP device, such as 602, maintains two independent task lists 610 and 630 which are used for keeping track of tasks currently running in the DSP operating system. One task list 610 is known as the "real-time" task list and is a set of routines which need to be operated upon at regular intervals. Each task, such as 611 through 614, in real-time task list 610 is executed only once during regular intervals so that the client requiring the services of each DSP task in task list 610 is serviced within a specific interval of time. A technique known as guaranteed processing bandwidth (GPB) is utilized to ensure that the tasks in real-time task list 610 do not exceed the maximum length of time in which real-time tasks may be executed. GPB is discussed in the co-pending application entitled "Apparatus and Method for Allocating Processing Time in a Frame-based Computer System" which has been assigned Ser. No. 07/954,338 and which is attached hereto as Appendix A. DSP Manager 211, through the client and device managers 211 b, ensures that an excessive number of real-time tasks not be inserted into real-time task list 610.

Real-time task list 610 links all the real-time tasks 611 through 614 which need to be performed within the DSP in a specified interval of time known as a real-time frame. Each of the "tasks" shown as 611 through 614 is actually a datum in a data structure which references the next task datum in the task list. During each real-time frame, DSP Kernel 211 scans the real-time task list 610 and executes each task 611 through 614 once in sequential order as indicated by the arrows shown in FIG. 6. When the end of the real-time task list is reached, for instance, at DSP task 614, then real-time task execution halts. Each of the DSP tasks 611 through 614 is actually a datum in a data structure which references certain DSP "modules" such as 621, 624, 625, and 627. Modules are related functions or subtasks within each task. Each DSP module datum such as 621 contains a first field 621a which references the executable code for the module. A second field, known as the DSP section(s) fields 621b, is used for referencing all the resources required by the executable module which is referenced by first field 621a.

In addition to real-time task list 610, the DSP device maintains a second task list known as timeshare task list 630. Timeshare task list 630 maintains a similar list of elements in a data structure, such as 631 through 633, each of which references so-called "timeshare" tasks or tasks that do not need to be executed at regular time intervals. Each of the elements 631 through 633 in the timeshare task list references "modules", such as 635, 636, and 639 which all contain references to executable code and resources required by each of the timeshare DSP modules. This is a similar structure to that set forth in the real-time task list described above. The timeshare task list is executed "round robin" whenever the real-time task list is not executing.

The maintenance of a separate real-time task list 610 and a timeshare task list 630 allows the grouping of functions by priority in the operating system of the preferred embodiment. Therefore, a distinction is made about which tasks are time-critical and those that are not. This is an improvement over the prior art single task list method which makes no such distinctions and may burden DSP 110 with more task execution than is actually necessary.

Time Allocated to Real Time and Timeshare Tasks

Figure 7A:
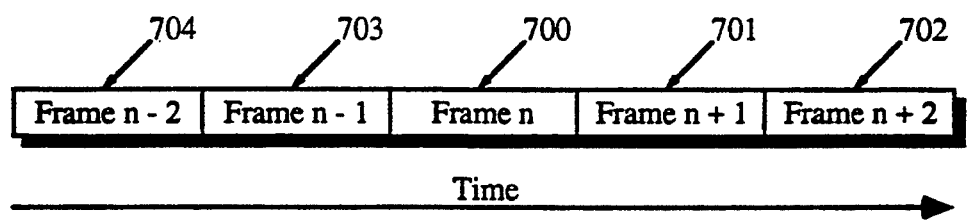
FIG. 7a shows an organization of time into discrete intervals known as frame's.

The unique grouping of tasks into real-time tasks listed in the real-time task list 610 and timeshare tasks listed in timeshare task list 630 provides for certain powerful capabilities which allow the DSP processing power to be allocated efficiently and provide for the execution of real-time tasks as quickly as possible. The preferred embodiment uses a "frame-based" approach to handling tasks residing in the two task structures. The frame-based approach to executing tasks is discussed with reference to FIG. 7a. As is shown in FIG. 7a, time is divided into uniform discrete intervals known as frames. A frame N 700 is preceded and followed by frames such as 701 and 703 which are the same length as frame 700. During each frame, the required program code, variables, and input data for each of the real-time tasks in task list 610 are loaded into a high speed cache. The program is executed from the cache, and the resulting output data is dumped from the cache back into external memory. Alternatively, the input data may already be in the cache, from a previous operation, and the output data may be retained in the cache if it is needed for following operations. This method of using a high speed cache is called visible caching.

The frame-based processing used by the preferred embodiment requires some latency in the data flow. An input port of the DSP must collect a full frame's worth of samples before the DSP can process them. Likewise, the DSP must generate a full frame's worth of samples before the output port can start transmitting them. This requires the latency of two frames between input and output data. This is shown with reference to FIG. 7b. For instance, the data which would be processed at frame 750 must be collected during the previous frame 751 while the previous frame's tasks are being processed. Input data N 760 collected during frame 751 will thus be available to frame 750 for processing. Likewise, data generated during frame interval 750 will not be available for output until frame 752, wherein the subsequent frame's data is being processed. Thus, output data N 761 will be available for output at the time that DSP 110 is processing information in frame interval 752.

Figure 7B:
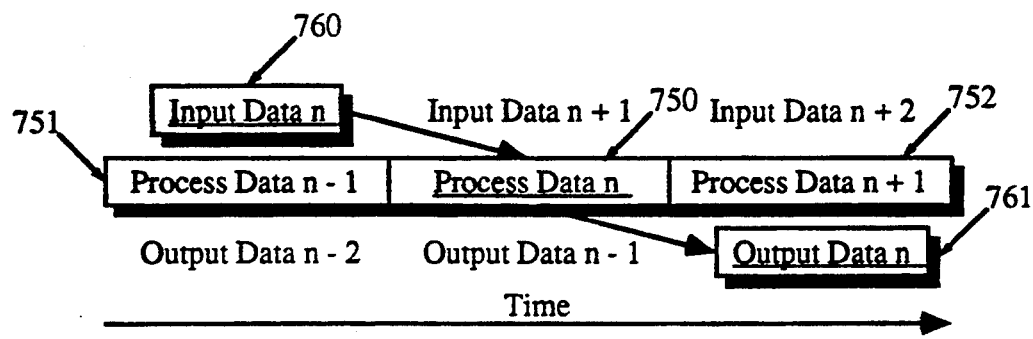
FIG. 7b shows the data processing latency of a frame-based system.

Frames vary in duration depending on the needs of the application program(s) and the available amount of resources. There are basically four factors which influence the selection of time intervals for frames. They are:
 1. Size of the buffer is proportional to the frame time interval. The longer the frame, the more cache memory is needed for each buffer.
 2. Overhead reduction is inversely proportional to the frame time interval. The shorter the frame, the greater percentage of DSP processing time is used in overhead. For example, if the frame represents 240 samples, the overhead is 1/240 or 0.42% compared to processing a single sample at a time.
 3. Granularity of access. During a frame, the processing sequence cannot easily be interrupted. Changes in process configurations must happen on frame boundaries. The longer the frame, the more granular the access.
 4. Input/output latency for various important algorithms. The longer the frame, the higher the latency between input to output data streams. As shown in FIG. 7b, latency is 2 frames from input stream to output stream.

Items 1 and 2 pull in opposite directions. Item 3 is dependent on the application. Sound synthesis with MIDI (Musical Instrument Digital Interface) is one of the most demanding potential applications, putting a lower limit on a frame at approximately 2 to 4 milliseconds per frame. Item 4 sets the upper limit on the frame time. The V.32 data modem has very demanding latency requirements and, has an upper limit of 13 milliseconds per frame.

The preferred embodiment uses a ten millisecond frame time. However, in order to practice the present invention, it would appreciated by one skilled in the art that any length frame has equal application here depending on the circumstances of operation.

Generally, each frame is broken up in the manner as described with reference to FIG. 8. A frame 800 which is executed for a given interval of time is comprised of three sections. A real-time execution portion 801, a timeshare execution portion 802, and a sleep portion 803. The real-time portion 801 is the time actually used to process the real-time functions which are currently active in the real-time task list 610 discussed above. Real-time section 801 may be variable in length depending on the number of tasks in the real-time task list 610. However, real-time portion 801 is limited to a maximum time interval within frame 800 as set by the allocated real-time guaranteed processing bandwidth limit shown as time 805 in FIG. 8. This limits the number of tasks and the length of execution of each of the tasks contained in task list 610.

The second portion of frame 802 is used for execution of timeshare tasks in task list 630. Timeshare task processing is performed within the segment of the frame which is a portion of the total timeshare available (ATT) 804. If there are no active timeshare tasks, this segment is skipped. All timeshare tasks are serviced round robin during segment 802 until either the frame ends or all timeshare tasks go inactive. If all of the timeshare tasks contained in list 630 are complete (go inactive) within one frame such as 800, then DSP 110 sleeps for the remainder of the frame at time portion 803 of frame 800. In other words, all processing is suspended and no tasks are performed until the next frame begins, wherein real-time tasks are again performed at a time period such as 801 shown in FIG. 8. Timeshare tasks may not be completed within a time less than the total timeshare available (ATT) in a given frame, in which case they take up the entire time period 804, and no sleep period 803 is present in the frame. Timeshare processing will continue after the real-time segment of the next frame. During period 800, if there are no active timeshare tasks to be performed, the processor actually goes into a sleep mode wherein all processing is halted and, in the preferred embodiment, the processor will shut itself down using a power down instruction. In the preferred embodiment, a DSP such as the AT&T 32010 issues the "power down instruction." The DSP will then be brought back into operation when the next frame interrupt signals the beginning of the next frame. This provides for automatic power savings especially in applications for use on portable computers. In another embodiment, DSP manager 211 in the host processor will even shut down all DSP related circuits contained in 100, including timers, serial ports, and other related hardware to further conserve power, if their function is not required.

The amount of timeshare task time available (ATT) 804 is dependent upon how many real-time tasks are being run in time interval 801. If time interval 801 is very short, then ATT 804 may comprise the entire frame 800.

Determining which processes will be executed during the real-time portion 801 of a frame, and which task will be run in the timeshare portion 802 of a frame, and thus be in one of the task lists 610 or 630, is dependent upon a number of factors. Real-time tasks are those tasks that must be executed every frame. This means that the task must be broken into distinct portions which must be executed in a frame. Real-time tasks are those that must be executed at regular intervals, not necessarily as quickly as possible. Any data stream task connected to a real-time port is such a task—such as a sound processing task, a speech processing task, or a telecommunications task. Any of these types of tasks, if connected to a real-time port such as a speaker, a microphone, or a telephone line, require real-time service. This type of processing is known as isosynchronous processing. Note that the same tasks could be non-real-time if they were used for off-line processing, such as doing sound processing of a disk file.

Tasks running in the timeshare task list 630 will give the maximum available processing time to an application. Real-time tasks may run at a guaranteed frequency, but their overall processing time is limited to the amount allocated. Even if there is unused processing time, real-time tasks are required to stay within their allocated processing time. Timeshare processing is called asynchronous processing. Some examples of timeshare tasks include lossless compression of disk files, graphics, animation, still image decompression or compression, video decompression, off-line audio processing, and other similar applications that require lots of processing time.

Figure 9:
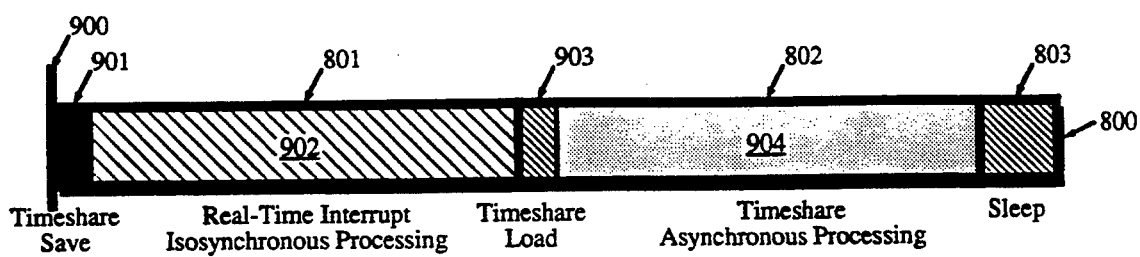
FIG. 9 shows a more detailed representation of the division of a frame into real-time and timeshare slices, with the associated load and store operations required by such tasks.

A more detailed view of a frame such as 800 is shown in FIG. 9. As shown in FIG. 9, at the time of a real-time frame interrupt at time such as 900, a process known as a timeshare context save 901 must be performed prior to real-time task processing, if timeshare was active when the interrupt occurs. If the interrupt occurs during the middle of timeshare task list 630 processing, then the timeshare task context must be saved because processing was halted during an on-going operation. This is performed at time period 901 as shown in FIG. 9. Once the timeshare context is saved as driven by the interrupt at time 900, then real-time interrupt isosynchronous processing may be performed at time period 902. A more detailed view of real-time task processing will be discussed with reference to FIG. 10 below. Then, at the completion of real-time task processing at time period 902, the timeshare task context, if any, which was saved at time period 901 is then restored at time period 903. At time period 904 timeshare task processing of timeshare task list 630 continues until the timeshare task list 630 is empty (all timeshare tasks have completed), all timeshare tasks are inactive, or the frame ends. If timeshare processing ends before the frame ends, as discussed above, the DSP may issue a power down instruction, and go into the sleep mode at time period 803 for the remainder of frame 800. Note that in this example, because the timeshare portion 904 completed prior to the end of the frame, no timeshare context save is required to be performed, as was done at time period 901, because no tasks are remaining in the timeshare task list 630. Therefore, at the beginning of the next real-time isosynchronous processing period 801 the timeshare process context will not need to be saved.

Figure 10:
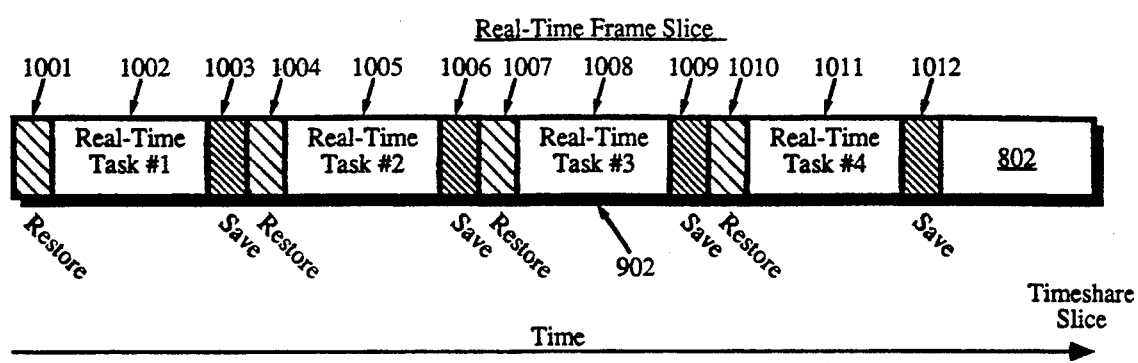
FIG. 10 is a detailed view of a real-time slice of a frame with the associated loading and saving of context during the execution of each real-time process.

A more detailed view of the real-time frame slice 902 where real-time task processing takes place is shown in FIG. 10. Real-time task list 610 is processed in turn by executing each real-time task in the list such as 1002, 1005, 1008, and 1011 shown in FIG. 10. Of course, each real-time task context needs to be saved at the completion of execution and restored prior to execution. For instance, real-time task it 11002 requires that its context be restored at time period 1001 and saved at time period 1003. Similarly, real-time task #2 1005 requires to be restored at time period 1004 and saved at time period 1006. This save/restore process is called visible caching, and may be reduced in time if one task utilizes the output of a previous task, where the data remains in the cache. In this case, the data does not need to be saved and restored, which allows one real-time task to access information from the previous task efficiently, thus increasing the number of tasks that can run in real-time frame slice 902. Finally, the last real-time task which is executed at time period 1011 is saved at time period 1012, and the timeshare slice 802 is then executed in the manner as discussed above. FIG. 10 is shown in a simplified form, assuming that each real-time task is a single operation. However, as will be discussed below, a task is actually comprised of several modules, and each module within the real-time task will be executed within the task such as in a time period 1002 or 1005.

Figure 11:
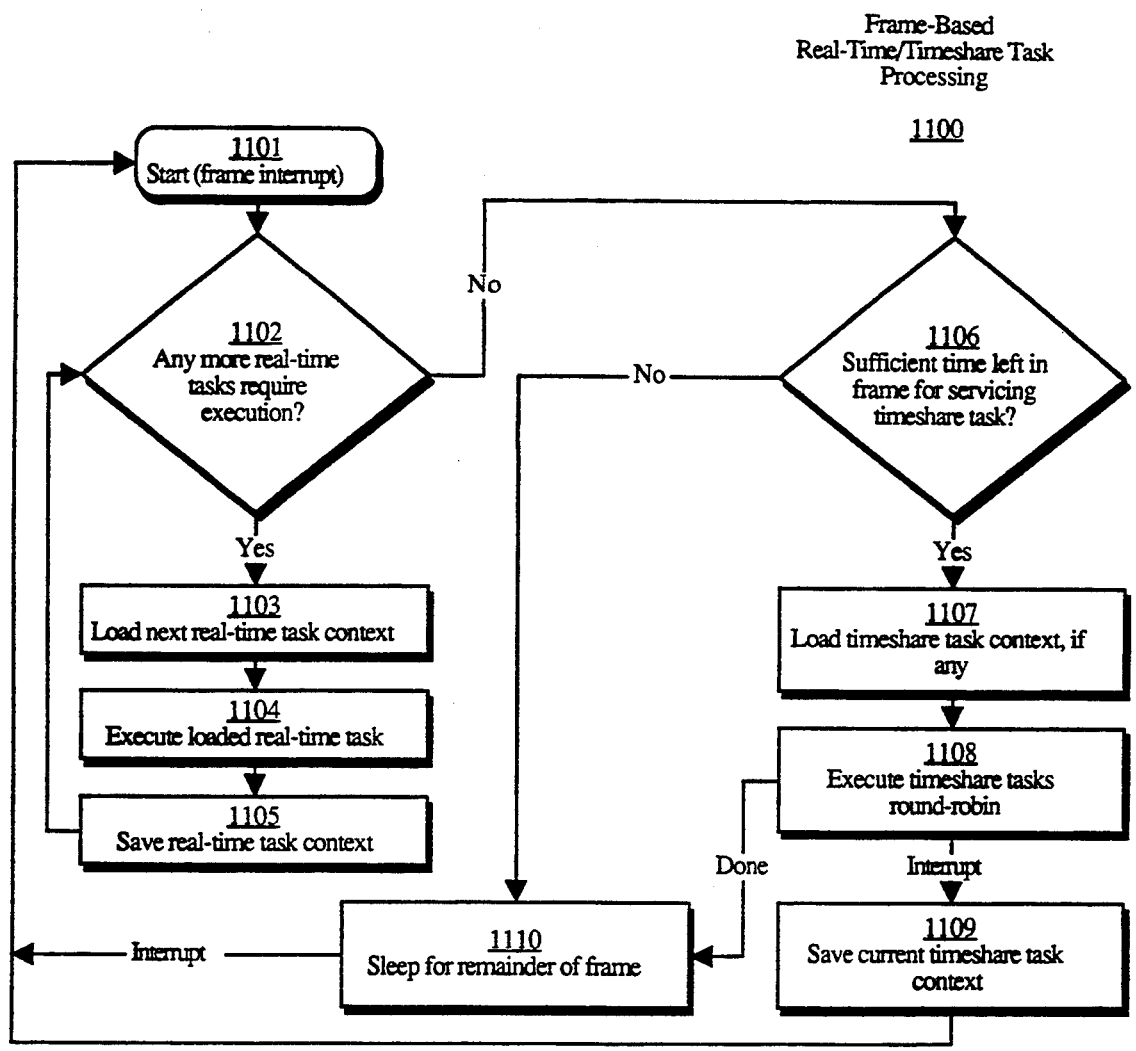
FIG. 11 is a flow chart showing the process used for servicing real-time and timeshare tasks.

In summary, the process used in the preferred embodiment to perform real-time and timeshare task processing is shown with reference to FIG. 11. Process 1100 commences at step 1101, and it is determined whether any more real-time tasks require execution at step 1102. This may be done by determining that the pointer to the next task is nil for task list 610. If there are more real-time tasks to be serviced, then step 1102 proceeds to step 1103 wherein the next real-time task context is loaded. The next real-time task is then executed at step 1104, and its context is saved at step 1105. Then steps 1102 through 1105 may be again be performed if there are any more real-time tasks left in real-time task list 610. Once all real-time tasks have been serviced as determined in step 1102, 1102 branches to step 1106 which ascertains whether there is time left in the frame for servicing timeshare tasks. In other words, a minimum period of time must be left in the frame in order for timeshare tasks to be performed. In particular, there should be enough time to restore context, do some processing, and then save context at the beginning of the next frame (since all three functions—load context, process, save context—are required each frame, there should be enough time remaining in the frame after real-time is done for all three operations before activating timeshare). It would be useless to restore the context if the context cannot be used to complete any processing. In the preferred embodiment, the time required for restoring and saving timeshare is determined during the boot process, and made available to the DSP Kernel so that the decision in step 1106 can be made. If there is insufficient time to restore and execute timeshare, a branch is taken to step 1110, and the DSP waits until the next frame to continue real-time processing.

If, however, it is determined at step 1106 that there is sufficient time left in the frame for servicing timeshare tasks in task list 630, then the timeshare task context saved prior to the last interrupt is loaded at step 1107. If there was no previous context, no context is loaded. However, processing continues to step 1108 in any case. This occurs in the case where a timeshare task has just been activated following a period of not executing timeshare tasks. Then, each of the timeshare tasks may be executed in turn at step 1108 by loading their respective context and executing the task at step 1108. This continues until one of two events happens:

1) The next frame interrupt occurs; or
2) There are no active timeshare tasks in task list 630.

If an interrupt occurs first, then the timeshare task context is saved at step 1109, and process 1100 returns to step 1101 for real-time task execution. If, however, there are no more timeshare tasks to execute, then process 1100 proceeds to idle or sleep at step 1110 wherein a power down instruction is issued in one embodiment of the present invention, or a delay loop is executed in another embodiment of the present invention, and DSP 110 waits for the remainder of the frame to transpire. Finally, the next frame interrupt occurs and the process returns to step 1101. In this manner, real-time and timeshare tasks may be managed according to their requirements, and processor bandwidth may be used efficiently.

Before a task is installed in the timeshare task list, it should first be determined whether that task can properly be serviced on a timeshare basis, due to the fact that the total timeshare available varies dynamically. The DSP Kernel knows how much processing time is available per frame, since it is computing the processing bandwidth for all of the real-time tasks. The total remaining (unused) real-time available for use by timeshare tasks may be computed as follows: for each frame, recompute the average time remaining after all real-time tasks have completed. A form of moving average calculation is utilized, such as:

average timeshare = previous average
value·0.9 + current frame value·0.1.

This gives each new frame's remaining time a 10% weight, against a weight of 90% on the previous average. Alternate averaging techniques can be used. Also, it is possible for the DSP Manager to do this calculation by sampling the value every N frames. While this may not be as accurate, it simplifies the Kernel.

In addition to the average available timeshare processing, the frequency of the timeshare task list execution is required. If there are many tasks in the timeshare task list, execution frequency for each task will be low. A measure of this can be computed by calculating a moving average of the number of frames required to completely process the timeshare list once. This must be done each time through the timeshare task list. The calculation could be done as follows:

frames used = ending frame number − starting frame number average frames used = previous average frames used·0.9 + current frames used·0.1

Note that it is possible to have a "frames used" value of zero for cases where few timeshare tasks are active or installed, or where most of the processing time is available for timeshare. This will result in an average frames used value of less than 1.0. Other averaging methods may be used. The average frames used value could alternately be computed by the DSP Manager by sampling the real-time and timeshare frame numbers on a regular basis. This will be less accurate, but reduces the Kernel complexity.

By using the average frames used and the average available timeshare processing per frame, the frequency in which a new timeshare task will be executed can be computed as follows:

current timeshare load = average timeshare·average frames used proposed timeshare load = current timeshare load + GPB estimate of task computed frames used = proposed timeshare load/average timeshare (the GPB estimate of the task is described in the co-pending application entitled "Apparatus and Method for Allocating Processing Time in a Framebased Computer System" which has been assigned Ser. No. 07/954,338 and is attached hereto as Appendix A).

If the calculated "proposed" frames used is too high (infrequent execution) for the desired function, the task should not be installed in the timeshare list. Note that a timeshare client must monitor the processing rate of its timeshare tasks because change in the real-time load or in the timeshare task list affects the amount of processing its timeshare task receives. This process can be assisted by notifying a timeshare client whenever a new real-time task is added to the task list. Another technique for monitoring timeshare processing rate is for the client to request the timeshare frame number from the DSP Manager. The number will be incremented once for each pass through the timeshare task list. Another aid to timeshare management is to provide the unallocated processing value per frame in addition to the average timeshare value described above. Since GPB can be allocated and not used, the unallocated processing is typically smaller than the typical average actually available processing. This number is used to give a "worst case" computed frame rate as follows:

current timeshare load = average timeshare·average timeshare frames used proposed timeshare load = current timeshare load + GPB estimate of task computed worst case frame rate = proposed timeshare load/unallocated GPB The computation gives the frame rate of timeshare execution, assuming all real-time tasks are using their allotted processing.

Dividing Tasks Into Modules

Returning to FIG. 6, it should be noted that each of the tasks residing in either the real-time task list 610 or the timeshare task list 630 are actually a series of data structures containing references to "modules" in the architecture of the preferred embodiment. A DSP "task" such as 611 is actually a datum in a data structure known as task list 610 which references a series of executable programs known as "modules." For instance, one task such as 611 may refer to modules 621, 622, and 623. Each of the tasks 611 through 614 and 631 through 633 are actually elements in a data structure which refers to these modules. Each of the modules such as 621 through 623 is a series of data structures within itself. The modules are all related functions within the task having predetermined functions. In this manner, having this dual level task structure, related modules may be associated with one another under one "task" heading.

A task such as 611 in the preferred embodiment is made of up of DSP modules such as 621, 622, and 623 and DSP tasks such as 611. Each of the DSP modules and DSP tasks are data structures, and are distinguished as follows:

DSP Module—A DSP module is the basic building block of DSP functionality. It always includes DSP code, but it may also include data, input and output buffers, and parameter blocks. The number of modules and the resources they require are definable by the DSP programmer.

DSP Task—A DSP task is made up of one or more DSP modules. This grouping places together, in the appropriate order and with the appropriate input/output and buffer connections, all the basic module functions needed to complete a particular job. A DSP task will frequently contain only one DSP module.

DSP modules such as 621, 622, and 623 are provided to an application programmer as a resource and loaded into a DSP task such as 611 using DSP Manager 211. A task is constructed using a series of calls to DSP Manager 211. These calls create the task structure, load and connect modules in the desired arrangement, allocate the required memory, and install the completed task into a DSP task list such as 610 or 630. Modules may be either programmed by the application programmer or may be obtained as off-the-shelf library routines called by the application program which provide certain specific functionality and achieve a result desired by the application programmer.

Each of the modules such as 621 comprises a DSP module 621a, which contains pointer information and other information related to the data structure, and a series of DSP sections 621b which each point to various resources and executable code required by the DSP module. This will be described in more detail with reference to FIGS. 10 through 12. A more detailed view of one task and its module organization is shown with reference to FIG. 9.

Figure 12:
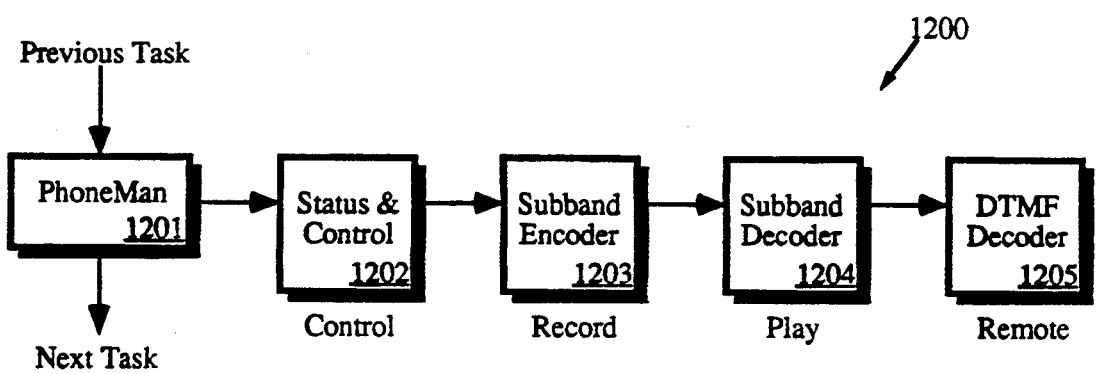
FIG. 12 shows the organization of one example task which has a series of modules linked and associated with one another.

1200 in FIG. 12 shows the task datum 1201 and its associated module data 1202 through 1206 which comprise a single task entitled "PhoneMan." PhoneMan 1200 is a phone answering machine task implemented within DSP 110 of the preferred embodiment. In this embodiment, the task datum 1201 is shown as having certain basic information about the task, for instance, the name "PhoneMan" and is referenced from the previous task in the task list, and contains a reference to the next task in the task list. Note that the PhoneMan task 1200 may be either a real-time task or a timeshare task depending on the application. Also, task datum 1201 contains a reference to a status module 1202 of PhoneMan which performs various control functions within the task. For instance, in one embodiment, the control or status module 1202 may control execution flow within the remaining modules 1203 through 1205. It should be noted again that 1202 through 1205 are merely data structure elements which may be either linked using pointers, or referenced in some other manner well-known to those skilled in the art. The actual executable routine required by such modules will be referred to in fields contained with each of the data structure elements 1202 through 1205. As mentioned previously, modules 1202–1205 may be off-the-shelf, commercially available modules to the application programmer, or the application programmer himself may code modules 1202–1205.

In the example shown in FIG. 12, in addition to the status module 1202 which controls overall execution of task 1200, is Subband Encoder module 1203. Subband Encoder 1203 is used to record messages from the incoming caller. The Subband Encoder module 1203 will reference a Subband Decoder module 1204, which is used to play greeting or other messages to the caller. Subband Decoder module 1204 references DTMF (Dual Tone Multiple Frequency) Decoder 1205. DTMF Decoder 1205 is used for detecting incoming touch tone control signals issued by an incoming caller. The results of this module are made available for the Status & Control module 1202 on the next frame through shared memory, and thus can be used to modify the operation of the answering machine program. Note that in this example, the Subband Encoder, Subband Decoder, and DTMF Decoder modules are likely to be available off-the-shelf, while the Status & Control module typically would be written to support a particular application.

The unique structuring of a task into "modules" as is set forth above provides for certain powerful functions. This is a distinct improvement over the linear manipulation of a task list which provides no logical connection between tasks in the task list. So, the primary advantage of the grouping of functions into tasks and modules, as is set forth and discussed with reference to FIG. 6 and 12, is to group functions by modules under a general heading known as a "task" in order to synchronize these functions very efficiently. Yet another advantage of using the dual level task structure is to handle error conditions. So, for instance, if one module such as the status module 1202 or the Subband Encoder 1203 incurs an error condition, then the subsequent modules which may be executed such as 1204 or 1205 may be aborted or flagged to not load and execute, and a message passed back to the DSP Manager in the host processor that the task aborted. Thereby, the entire task datum 1201 may be flagged in some way that the task has an error condition, and thus the task may be either reinitialized, aborted, or removed from the task list. Many error handling conditions are contemplated within the spirit and scope of the present invention.

Yet another advantage of the grouping of tasks to modules under one task heading is to manage the bandwidth of the processor in an efficient manner. In this way, the worst case execution duration (known as "guaranteed processing bandwidth" or GPB) of the modules for a task such as 1200 may be maintained in a datum such as the task data structure element 1201. By using this worst case timing, the execution of the real-time and timeshare portions of the frame may be managed efficiently within the bandwidth provided by the processor.

In general, the overall advantage of having a structure similar to that shown in FIGS. 6 and 12 is to allow efficient client management of tasks by modules. So, error conditions, insufficient time in a frame, execution flow (see below), resource allocation (such as memory), and any other operating conditions which makes referring to the tasks by modules convenient are made substantially easier to the application programmer. Because tasks can be referred to in a task list, and those tasks by the modules they reference, process management in the DSP is much more efficient. Further, development of application programs is simplified by allowing the development of DSP specific modules which can be used to form application programs.

In summary, the modular architecture of the preferred embodiment provides a number of advantages over the prior art. It can be appreciated by one skilled in the art that the application and utility of the present task structure between the dual-threaded task lists shown as 610 and 630 in FIG. 6, and the dual-level module structure shown in FIGS. 6 and 12 has utility far exceeding that disclosed herein.

Controlling Module Execution Flow

Another advantage provided by structuring of tasks into modules, as discussed with reference to FIG. 12 above, is that the control of execution flow within tasks may be accomplished by placing references in each module to subsequent modules. This is done in the preferred embodiment by making calls to routines in the DSP Manager. In this manner, instead of the use of programming constructs within application programs in order to control execution flow between modules in a task, a facility is provided in order to update and prevent modules from even being loaded into memory, and thus conserving resources and the bandwidth of the processor. This is done using a technique known as skip processing.

Figure 13:
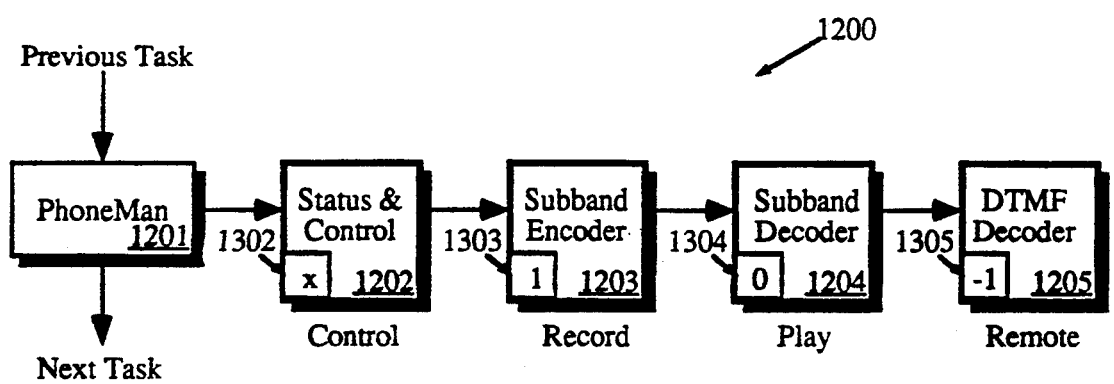
FIG. 13 shows a method used by the preferred embodiment to control the execution flow of modules of a given task.

Skip processing is described with reference to FIG. 13. As is shown in FIG. 13, task 1201, as was discussed above, is shown, however, each module now has associated with it a field such as 1302 of module 1202 which is entitled a "SkipCount." A SkipCount such as field 1302 indicates which is the next module to be executed. In the example shown in FIG. 13, status module 1202 contains a SkipCount field 1302. SkipCount 1302 may contain an integer value indicating which is the next module to be executed. This allows execution of the modules to flow properly and be controlled within the application or DSP program. The value contained in SkipCount field 1302 may contain a value as follows which specifies which module is executed next:

| SkipCount | Action |
| --- | --- |
| −1 | End task. |
| 0 | Execute next module. |
| 1 | Skip next module (and execute following module). |
| 2 | Skip next two modules. |
| N | Skip next N modules (proceed to N + 1th module after current module). |

Referring to the example shown in FIG. 13, 1302 contains an x (undefined), indicating that this SkipCount value is set by the Status & Control module 1202. SkipCounts such as 1302 within a module may only be modified by the module, or by the host. In this instance, SkipCount 1302 is modified by the module that owns it, 1202. If the phone is on-hook and is not ringing, this value is set to −1 by a call to the DSP Kernel, and none of the other modules in PhoneMan are executed. This frees up the maximum processing for timeshare tasks.

Once the phone rings the appropriate number of times, counted by module 1202, it is taken off-hook, also by module 1202. A few frames later, it is appropriate for a greeting message to be played. The Control & Status module 1202 sets its SkipCount field 1302 from −1 to 1, and thus the Subband Decoder module 1204 and DTMF Decoder module 1205 is activated by skipping the next module 1203. Subband Decoder 1204 plays the message, which usually will last for numerous frames, and DTMF Decoder module 1205 will scan the incoming data to see if the caller is issuing commands to the application via the Touch Tone keys on his phone. If so, these values are placed in a shared memory location for processing by either the application or by Status & Control module 1202. In this way, a caller my interrupt the greeting, and access other functions of the answering machine. These other functions could be handled by the host application, or by additional modules in the task.

Once the greeting has completed and a "beep" is played (part of the greeting, or generated by yet another module), Status & Control module 1202 resets its SkipCount 1302 to 0, causing the Subband Encoder module 1203 to become active (in other words, skipping to the next module 1203). Since SkipCount 1303 of the Subband Encoder module 1203 is a 1, execution proceeds to DTMF Decoder 1205, and skips the next module, Subband Decoder 1204. This selection allows any incoming message to be recorded, and still maintain the DTMF Decoder function for continued remote access control by the caller. Once Status & Control module 1202 determines that the call is complete, it sets its SkipCount 1302 back to −1, and processing remains in the single control module 1202 until a next call is received.

As can be appreciated by those skilled in the art, there are many configurations possible for a multiple module task, depending on the function desired and the function modules available. In the example of PhoneMan task 1200, all of the modules can be standard functions with the exception of the Status & Control module 1202, which must be written specifically for the answering machine application. However, the Subband coders and DTMF decoder 1203–1205 modules do not have to be specific to the telephone application, but can be used in other configurations and applications and may be commercially available as off-the-shelf components. Normally, the SkipCount of these modules is initialized to 0 when loaded, and must be set to the desired values for the specific application by the application program prior to setting the task active. Note again that in the preferred embodiment, modules may modify their own SkipCount fields only, but the host processor may also change the SkipCount in such a module at any time. This allows a control module such as 1202 to perform such actions through the host.

A set of examples using the SkipCount field are shown in FIGS. 14a through 14d. For instance, as shown in FIG. 14a, all of the modules 1401 through 1405 are executed sequentially in rum because each of the SkipCounts contained in the modules are 0, except for 1405 which contains a SkipCount of −1 indicating that it is the last module in the execution list. Note that it does not matter what the SkipCount value is for the last module, since in any case execution of the task terminates there. FIG. 14b shows an example wherein modules 1410, 1411, and 1413 are executed in turn. The SkipCount in 1410 contains a 0, thus indicating that it should skip to the next module 1411. The SkipCount in 1411 contains a 1 indicating that it should skip the next module 1412, and thus proceed to execute module 1413.

The SkipCount of module 1412 is ignored. Module 1413 contains a SkipCount field of −1 indicating that it is the last module to be executed.

Yet another example of an execution flow is shown in FIG. 14c. The execution path in FIG. 14c executes 1420, 1421, and then 1422, in turn. 1420's SkipCount field contains a 0 as does module 1421. So, each of those modules is executed in sequence, passing control to module 1422. 1422's SkipCount field is equal to a −1, thus indicating that it is the last module in the execution path shown in FIG. 14c. Finally, the execution of the modules shown in FIG. 14d flows from module 1430 to module 1433. Module 1430 contains a SkipCount equal to 2 indicating that the execution should skip modules 1431 and 1432. Modules 1431 and 1432 are skipped and not executed, and execution proceeds to module 1433. Their SkipCounts are ignored. 1433 contains a Skip-Count equal to 0, thus indicating execution should proceed to module 1434, and module 1434's SkipCount contains a −1 indicating that it is the last module in the execution flow.

Thus, it can be appreciated by one skilled in the art that control flow of modules arranged in the fashion discussed with reference to FIGS. 13 and 14a–14d prevents the unnecessary loading of executable modules. Thus the unnecessary consumption of resources due to a program's loading and saving (even if not functionally required) is avoided by using a SkipCount field as discussed above. It can be appreciated by one skilled in the art that the use of a SkipCount and thus the external control of execution flow outside executable modules has utility exceeding that disclosed herein. It should also be appreciated by one skilled in the art that the particular value and association of the SkipCount as a field within the module datum is not required for practicing the present invention. For example, a SkipCount may, in an alternative embodiment, represent the next module to be performed wherein a positive integer value N would indicate which next Nth module to skip to, a negative value might be used to return to an earlier executed module in the task (e.g., −1 means return to the previous module) and a zero means to end the task. It can be appreciated that many departures within the scope of the invention disclosed herein may be made by one of ordinary skill in the art.

Synchronizing Task Execution

Another feature provided by the preferred embodiment's unique structuring of tasks in a task list, such as real-time task list 610 and timeshare task list 630, is the use of a series of flags to control task execution within a specified interval of time. Simultaneous task activation and deactivation is provided for real-time tasks in the preferred embodiment because certain of these tasks may be required to be run within a particular time interval of one another. This is required in two cases:

1) A task or series of tasks must be started in sequence at a particular frame separation on the same processor;
2) A task or series of tasks must be started in sequence at a particular frame separation on different processors.

The first case may occur if the first task (data producer) does not generate frame-synchronous data (i.e., a frames worth of data every frame), and is connected to a task (data consumer) which requires data every frame. An example of this is a decoder which works on frames longer than the current frame rate, and therefore must break up the decoding of its data over several frames, and only has data output when it is complete. An example is the MPEG II audio decoder, which uses frames longer than the standard frame rate provided in the system of the preferred embodiment. This makes the data output of such tasks "bursty" rather than frame synchronous, and thus it must be fed into a FIFO, and the data consumer must be started some fixed number of frames later. The host cannot be responsive enough to be able to ensure that the starting sequence is correct or in time without a real-time mechanism.

The second case is easier to see. When a series of frame-synchronous tasks are passing data between them on a single processor, data synchronization is automatic. All tasks should be started at the same time, and the data flow and synchronization is determined by the ordering of the tasks and modules. However, if the same tasks are placed on several different frame-synchronous processors, there is no guarantee of their time relationship within any given frame. In fact, the data must be transferred via a buffer such as a FIFO, and the producer task must be started one frame ahead of the consumer task, to ensure that there is a supply of data every frame for the consumer. In the preferred embodiment, a simplified version of the FIFO is used for this purpose. This simplified FIFO is called a HIHO, and only holds two frames of data. It can be clearly understood by anyone familiar with the art that this case—a two frame buffer and a one frame starting offset—is the minimum latency case for such a system.

Thus, what is required is a mechanism that allows a host application programmer to set up the activation of a set of tasks, which may be on one or several different DSP's, where they can be activated in proper sequence and relative frame position. While it is possible to do this with two separate mechanisms—one for a single processor, and a separate mechanisms for multiple processors, it is more efficient to do it with a single mechanism.

The method in the preferred embodiment for accomplishing this startup synchronization is also used for deactivating tasks. The function is identical. The function consists of two DSP Manager calls and a routine in the DSP Kernel's Executive routine.

Figure 15:
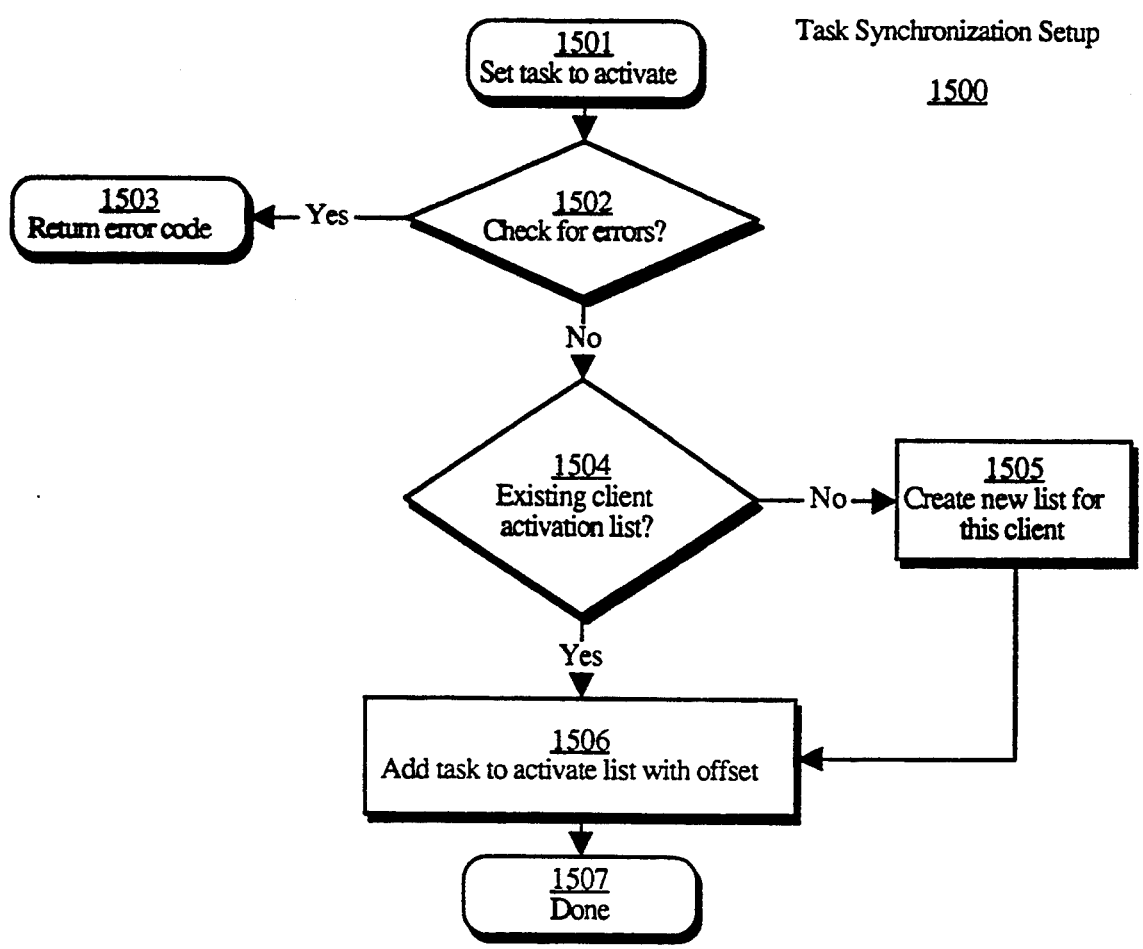
FIG. 15 shows a flow chart of the method used for setting up a sequenced and precise frame related task activations.

The client starts by telling the system which tasks it wishes to activate (or deactivate or any combination thereof) by making a series of "Set Task to Activate" calls. This call, shown in FIG. 15, sets up a data structure which contains the information necessary to quickly do the proper operations on the task list when it is time to do so. The client provides the task name or a task reference number, and the relative activation frame. For example, the relative activation frame value of 0 (zero) means that that task will start first. A value of 1 means that that task will start one frame after any task with a value of 0. A value of 2 means a two frame delayed activation, etc. This may be useful for the producer/consumer relationship discussed above.

The DSP Manager sets up a data structure with the required information. In one embodiment, the data structure is an array. The data required is a means for rapidly accessing the task structure (a task pointer, for example), and the frame activation offset value discussed above. For multiple DSP systems, a DSP reference is also required to allow error checking. The process starts in step 1501, the entry point. Step 1502 checks for errors. In one embodiment, errors include conditions where the task is still in the process of responding to a previous activation/deactivation command. For a multiple processor system, an error may occur if one of the specified DSP's is not frame synchronous to previously specified DSP's in the current activation list. Another error is an attempt to synchronize tasks that are on both the timeshare and real-time task lists 610 and 630, or to try to synchronize tasks on two different timeshare task lists. Neither of these operations make any sense, due to the nature of the timeshare task list. If an error occurs, an error code is returned to the client, step 1503.

Assuming no errors, the process proceeds to step 1504, where it is determined if a activation list has already been started for this client. Note that there are various ways to implement this function, but the method described here is the preferred embodiment. If no such list exists for this client, then a new list is started, step 1505. The task is added to the activation list in step 1506. The list includes all of the necessary data to accomplish the activation. Finally, the process is complete in step 1507.

Figure 16:
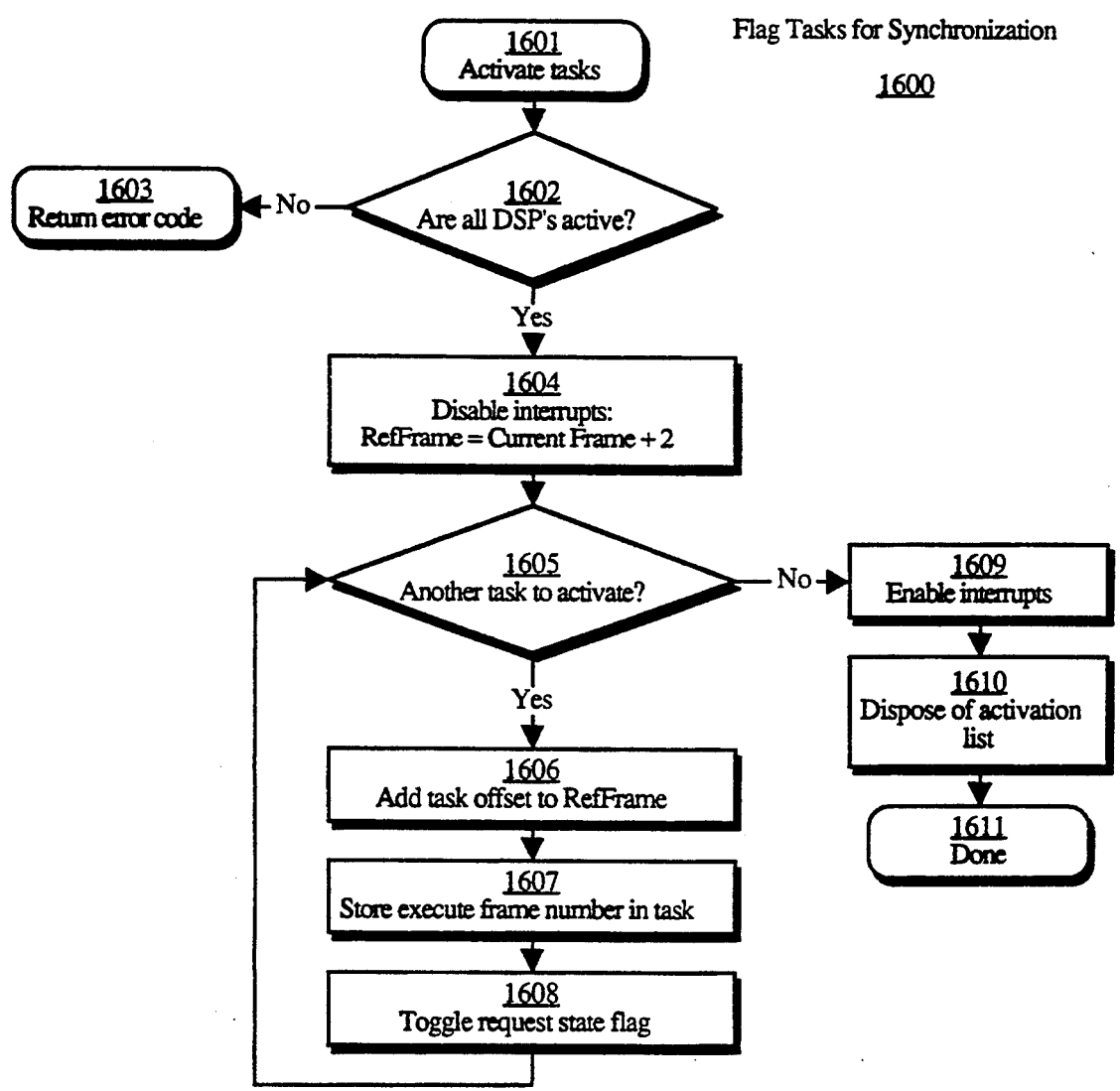
FIG. 16 shows a flow chart of the method of activating the sequence specified in FIG. 15.

The client calls the described routine as many times as required, setting up the activation list. When all the required tasks are added to the activation list, then the client makes a Task Activation call, shown in FIG. 16.

The activation routine entry point is shown as 1601. Step 1602 checks to see if all DSP's referenced in the current Activation List are running and are synchronized. This repeated check insures that the configuration was not changed during the time the client was setting up the activation list. If either of these two conditions exist, an error code is returned, step 1603.

Assuming no errors have been detected, step 1604 deactivates interrupts on the host, and calculates the Reference Frame Number. In the preferred embodiment, this is the current frame number plus 2. Having interrupts disabled and performing this simple calculation ensures that the first possible activation frame is far enough in the future that all task list modifications will be complete prior to that frame. The value 2 is used here rather than 1 because it is possible that the current frame number in shared memory will change immediately after the value is read by the host. If the first possible activation frame was the value read plus 1, and the number changes immediately after being read, the first activation frame is already under way, and a required activation may be missed. By adding 2 to the number of frames to delay the simultaneous start/stop, it can be assured that at least one whole frame will pass after the number is read and before the task update process must be completed.

Note that this mechanism is designed to provide the shortest possible interrupt disable time for the host. The list is structured in such a manner that scanning down the task lists and checking for tasks desired to be synchronized is not required during interrupt disable time.

In step 1605, we check to see if there are any more tasks to process in the Activation List. If so, we proceed to step 1606. Here, the offset value provided by the client is added to the Reference Frame Number. This gives us the Activation Frame Number for this task. In step 1607 we store this number in the task data structure for use by the DSP Kernel. In step 1608, we toggle the Requested State Flag. This flag indicates if the task should be active or inactive. It is a request flag, since its value does not indicate the actual state of the task. There is another flag, the State Flag, which only the Kernel can modify, which indicates the actual state of the task. The toggle convention is used in the preferred embodiment, because this allows the same mechanism to be used for either activation or deactivation of a task. However, separate flags can be used in an alternative embodiment, and this can be handled by the single call by requiring the client to pass a parameter indicating which state the process desires, or can be handled by separate calls, such as "Set Task to Activate" and "Set Task to Inactivate."

Once this Activation List element has been implemented, the process returns to step 1605 to check for additional items in the Activation List. If there are no more, the process proceeds to step 1609, otherwise, it returns to step 1606. Step 1606 through 1608 are repeated for each task in the Activation List.

In step 1609, interrupts for the host are re-enabled. In step 1610, the activation list is disposed of. Alternate embodiments may require the client to do this. Finally, the process is done in step 1611.

At this point, the client has completed all of the steps required to activate or deactivate a set of one or more tasks. Note that each step in the process does not require any waiting by the host—each call is immediately processed. This was another of the requirements for the mechanism: in a multi-tasking system, it is desirable to avoid idle loops waiting for some other process to complete. This eliminates wasted host processing.

This process is designed to complete at the latest well before the end of the frame preceding the first activation frame. This prevents any race conditions between the host and the DSP processors, and ensures a proper sequencing of tasks in time.

Figure 17:
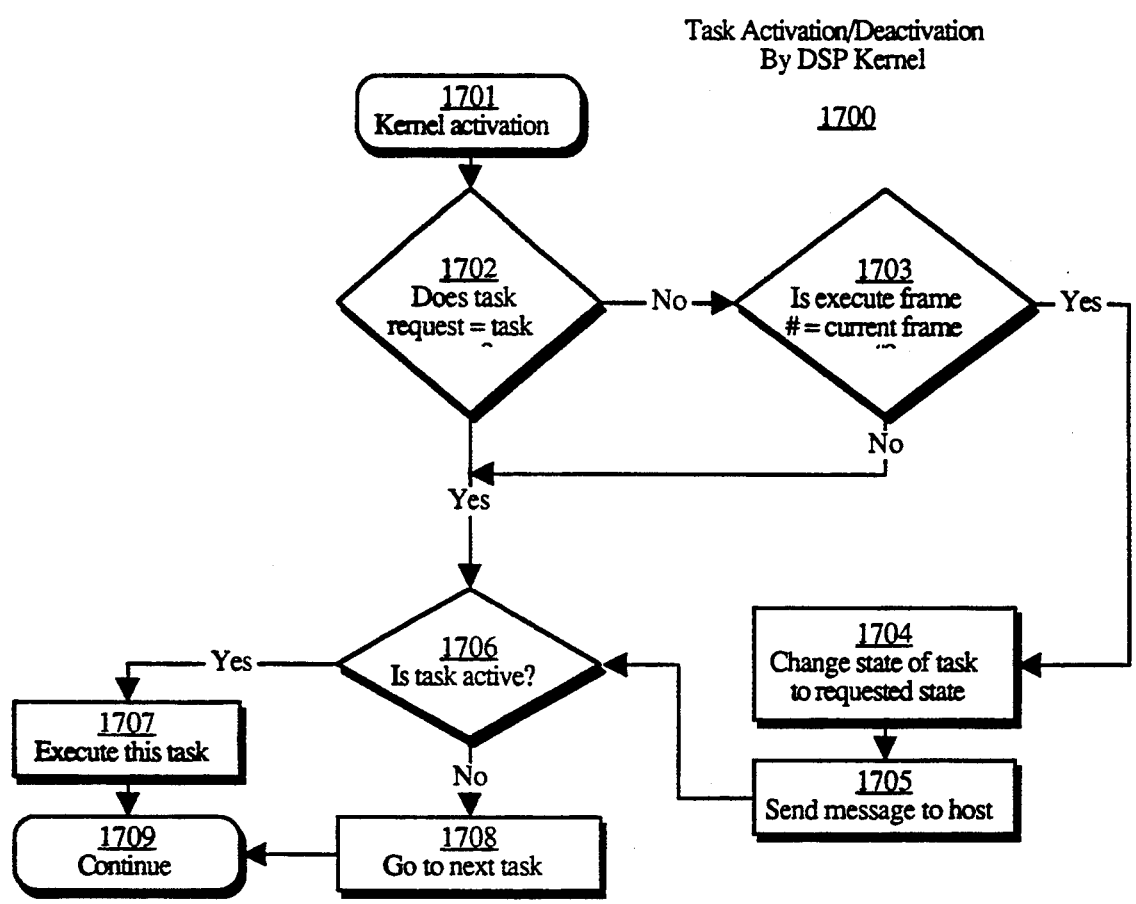
FIG. 17 shows a flow chart of the relevant portion of the DSP Kernel executive routine that actually carries out the task activation as set up in FIG. 15 and 16.

The DSP Kernel Executive program is responsible for the sequencing of tasks on the DSP. The relevant portion of the Executive for handling the task activation/deactivation function is shown in FIG. 17.

The entry point for Kernel Activation event servicing is shown in step 1701. The Kernel compares the actual status of the task with the requested status in step 1702. If they are the same, the process continues to step 1706. If they are different, the process goes to step 1703. Step 1703 checks to see if the activation frame number is the same as (or less than) the current frame number. If it is, then processing continues with step 1704. Otherwise, processing continues to step 1706. Step 1704 changes the active status to be the same as the requested status. Step 1705 sends a message to the host to indicate that the activation or deactivation has been completed for this task. This step is important when power management is desirable, as in a portable application. This message allows the Power Manager, a part of DSP Manager 211, to determine when power can be reduced or eliminated in the DSP subsystem. This is possible because all task activations and deactivations are handled by this mechanism. Once the task activation or deactivation is complete, the process continues with step 1706.

Note that if the activation frame number is less than the current frame number, an activation error has occurred—i.e., the task should have been activated in an earlier frame. This should never happen in a properly configured system. However, in some embodiments, this error could be checked for and reported via a message to the DSP Manager and the task's client.

In step 1706, the Kernel determines if the current task is active or inactive. Note that the state may have just changed. If the task is inactive, processing continues with step 1708 by looking for the next task. Otherwise, step 1707 executes the current task. In either case, processing continues with step 1709. The activation process shown in FIG. 17 is repeated for each task in both the real-time and timeshare tasks lists.

Figure 18:
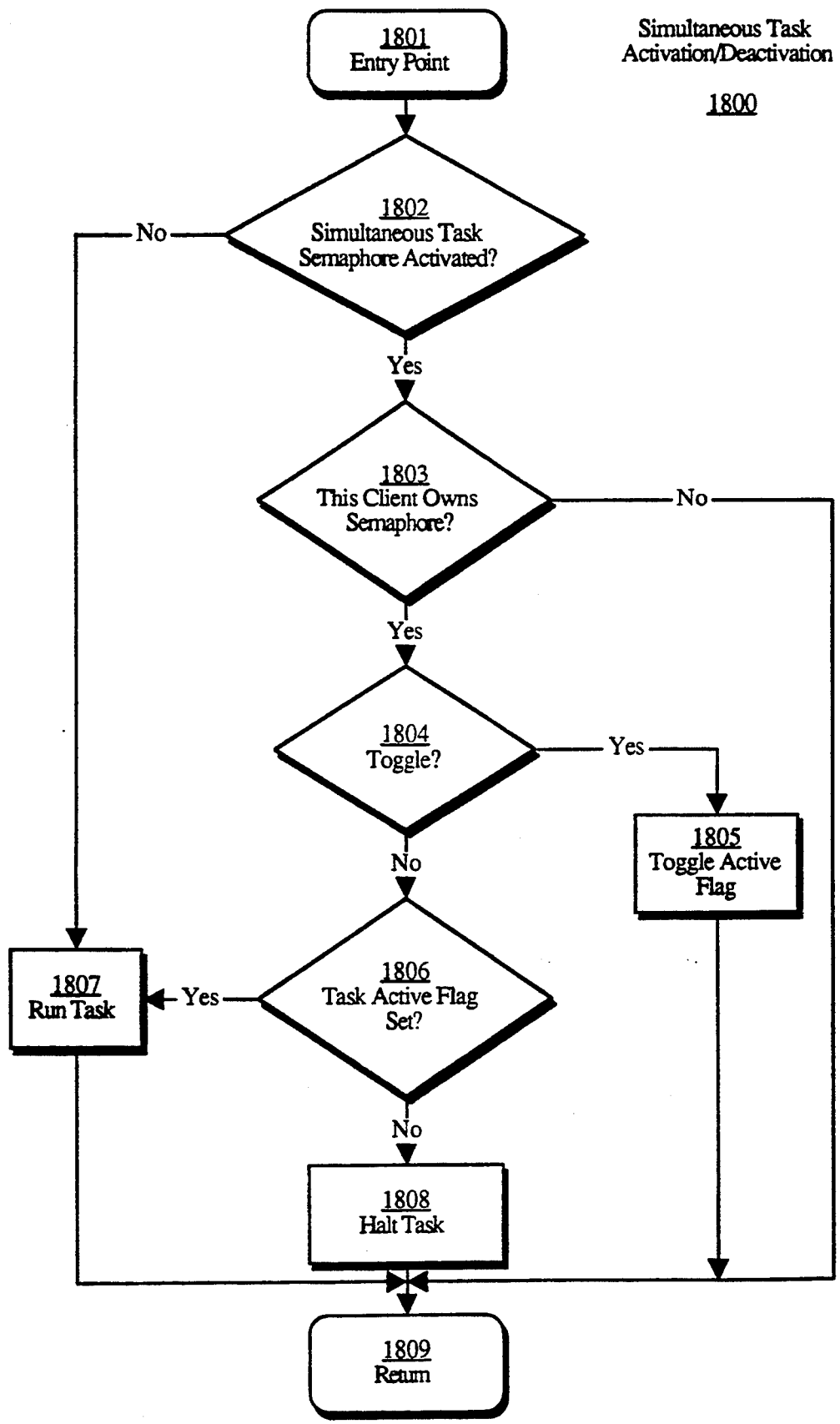
FIG. 18 shows a flowchart of an alternative task activation/deactivation process.
Figure 1:
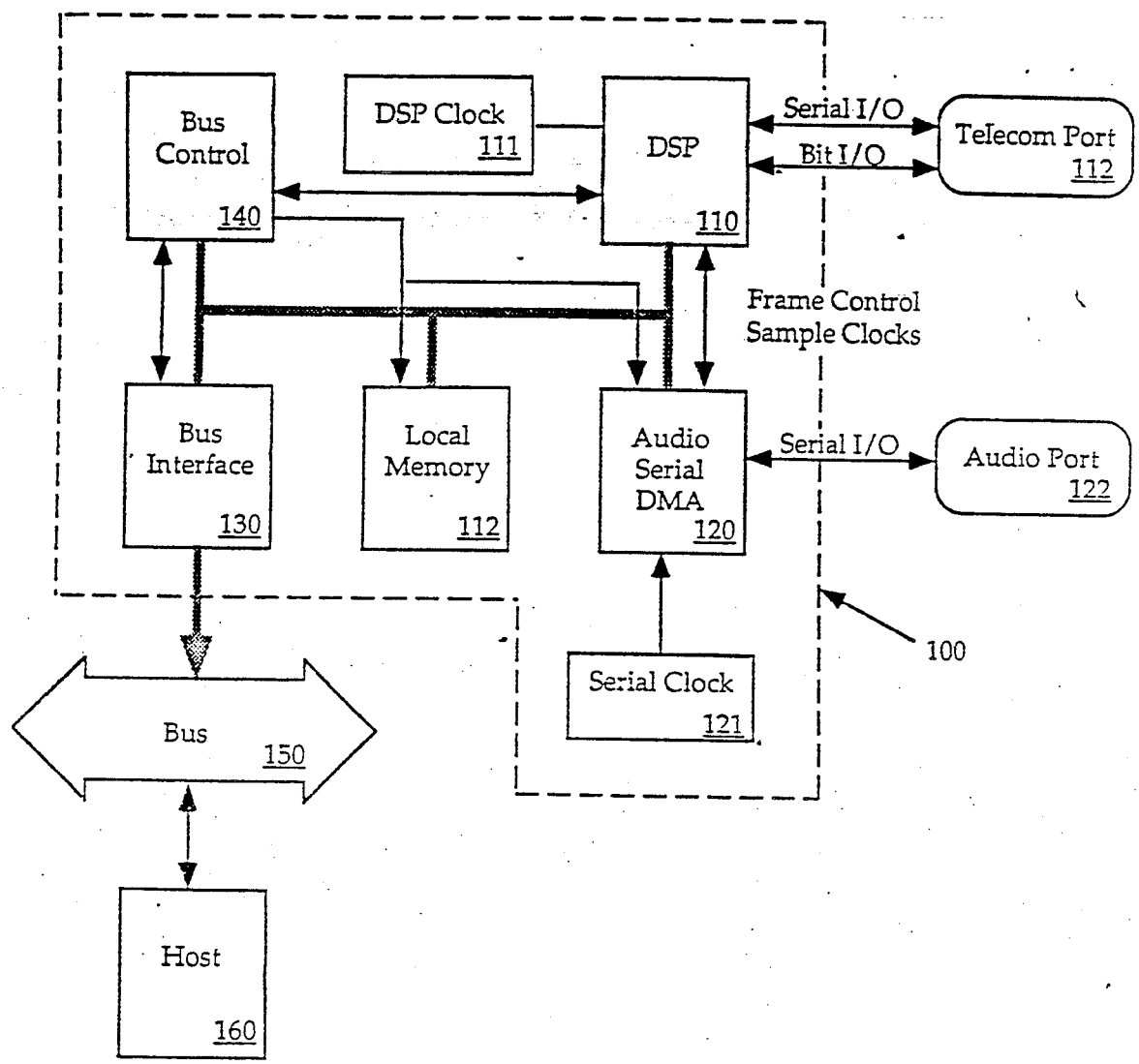
Figure 2:
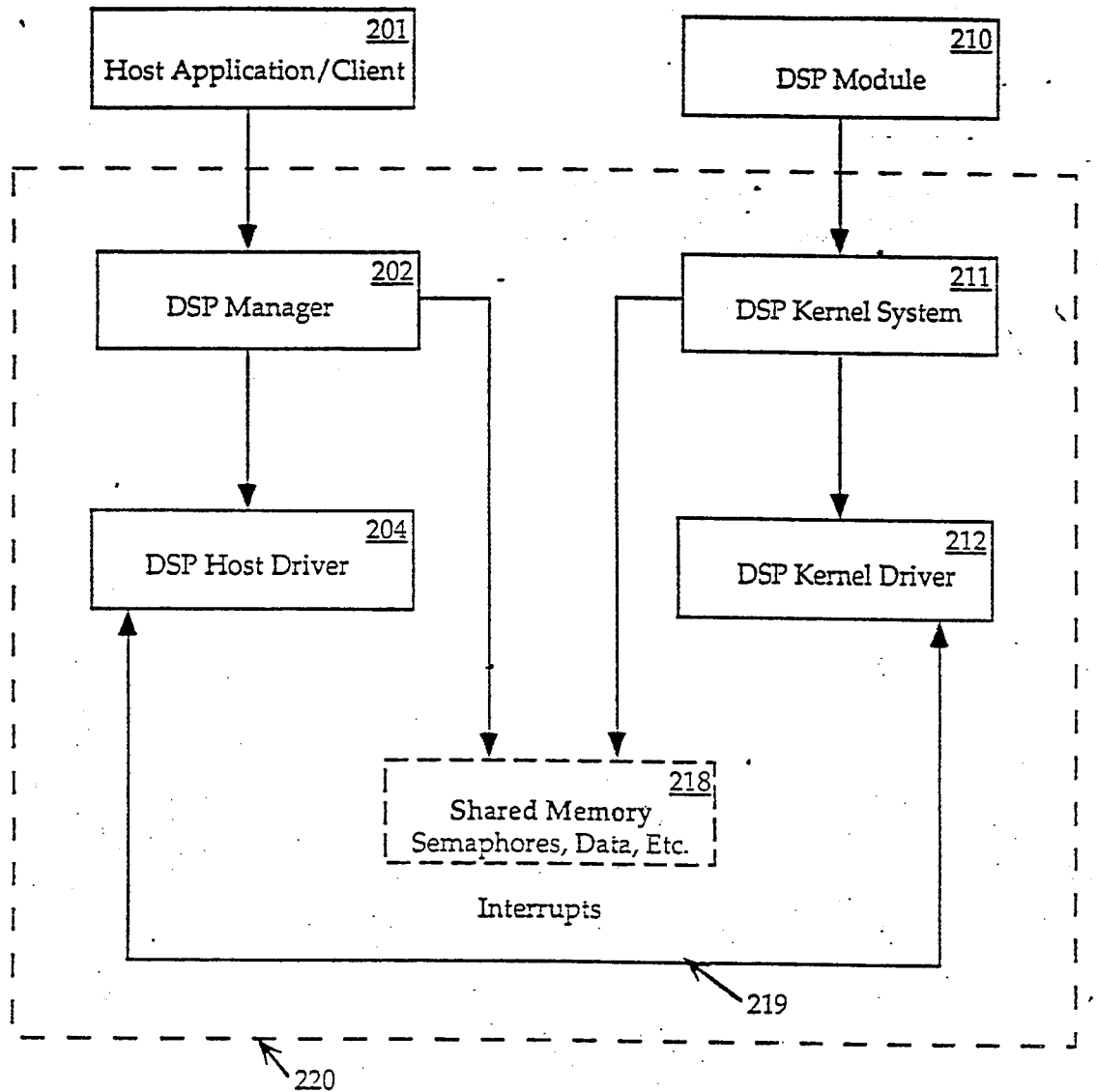
Figure 3:
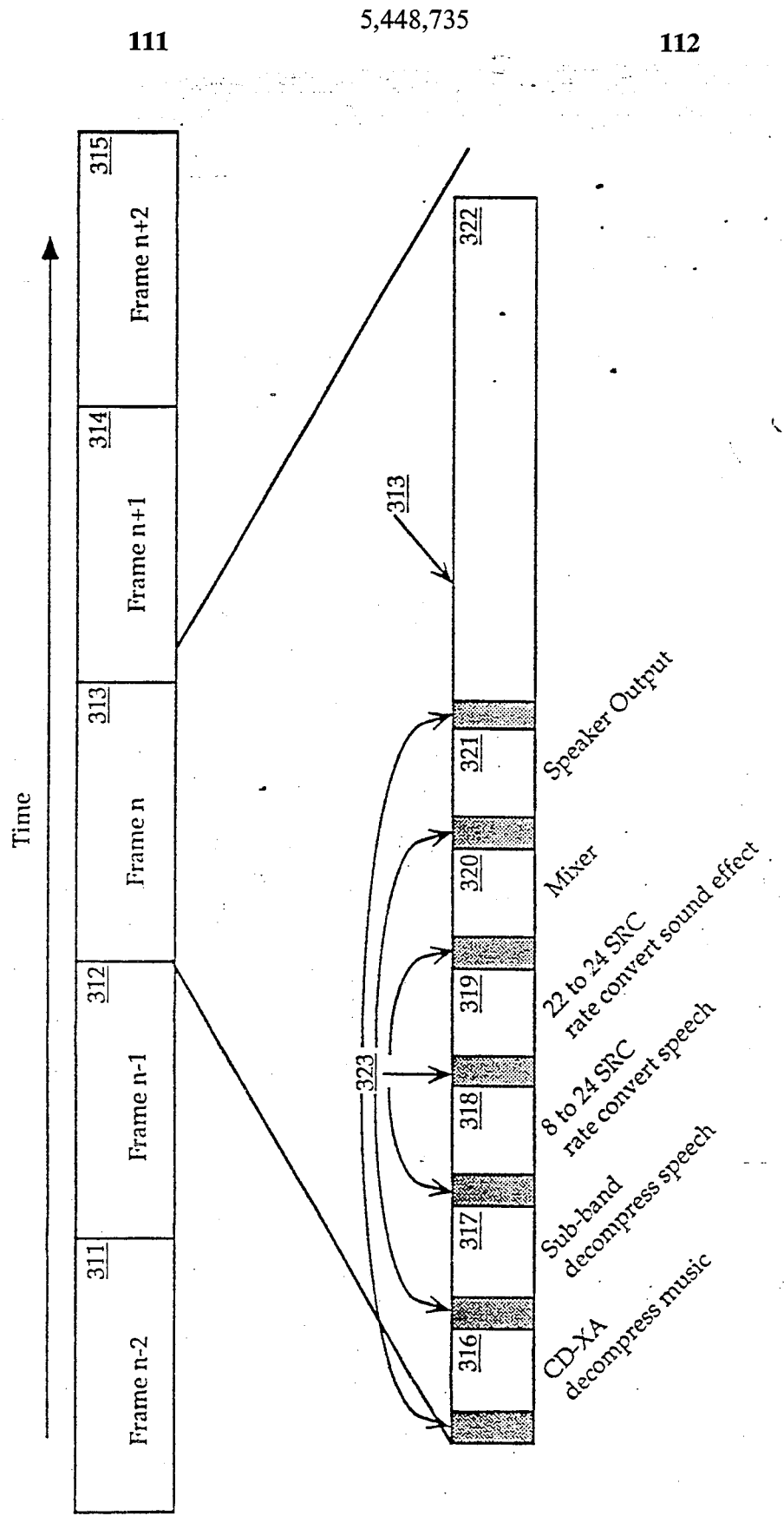
Figure 4:
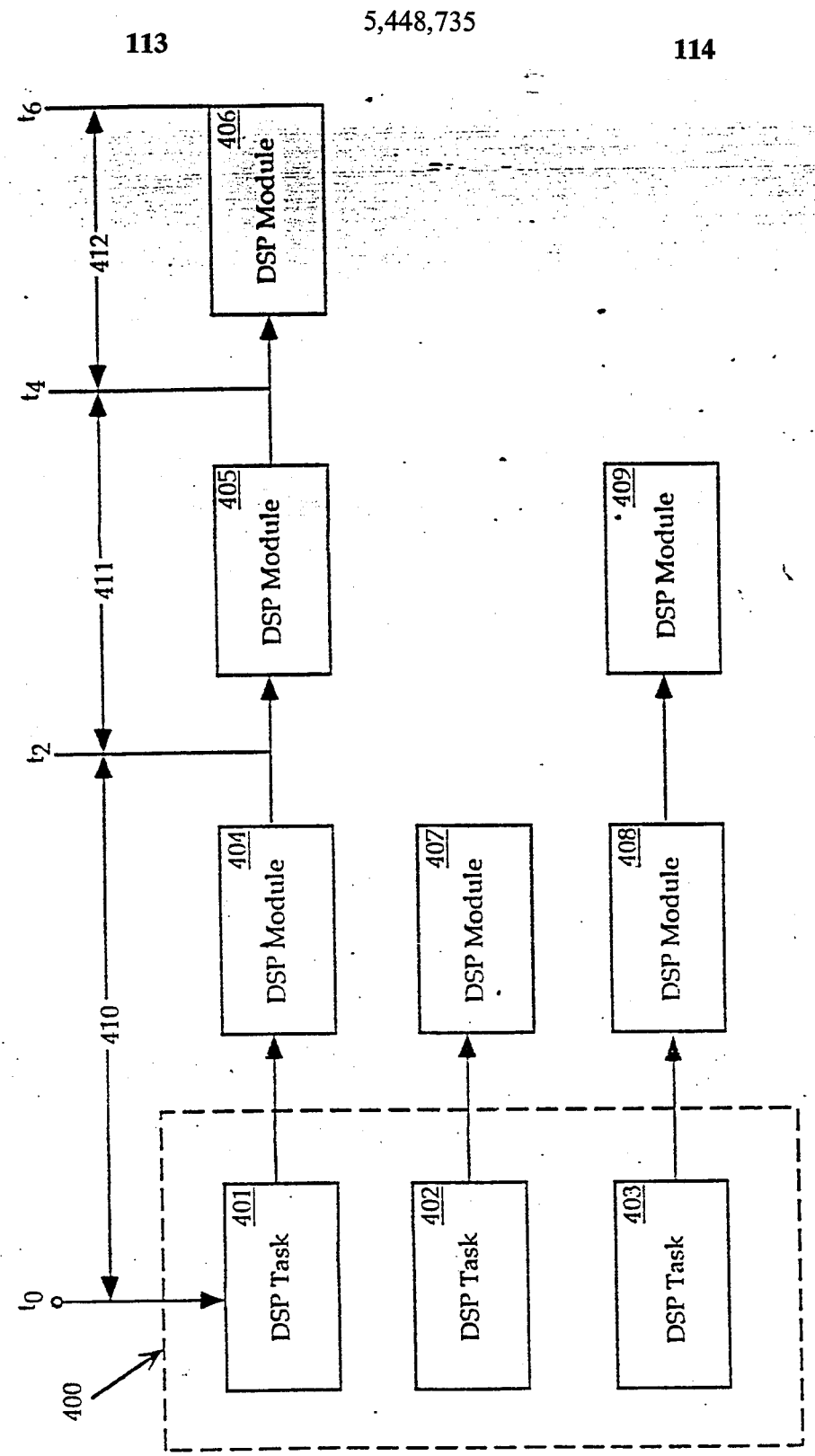
Figure 5:
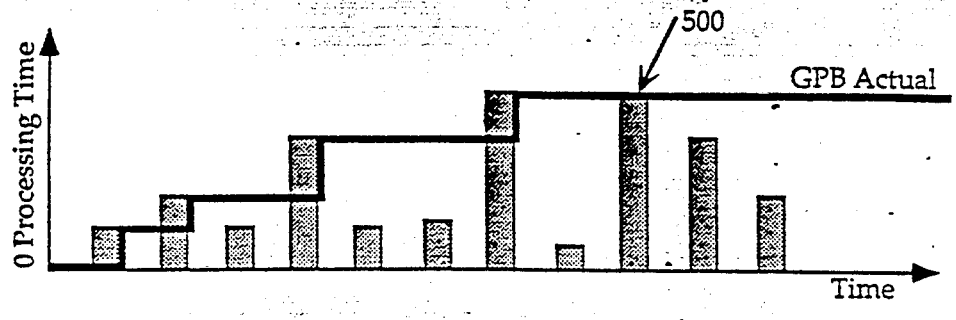
Figure 6:
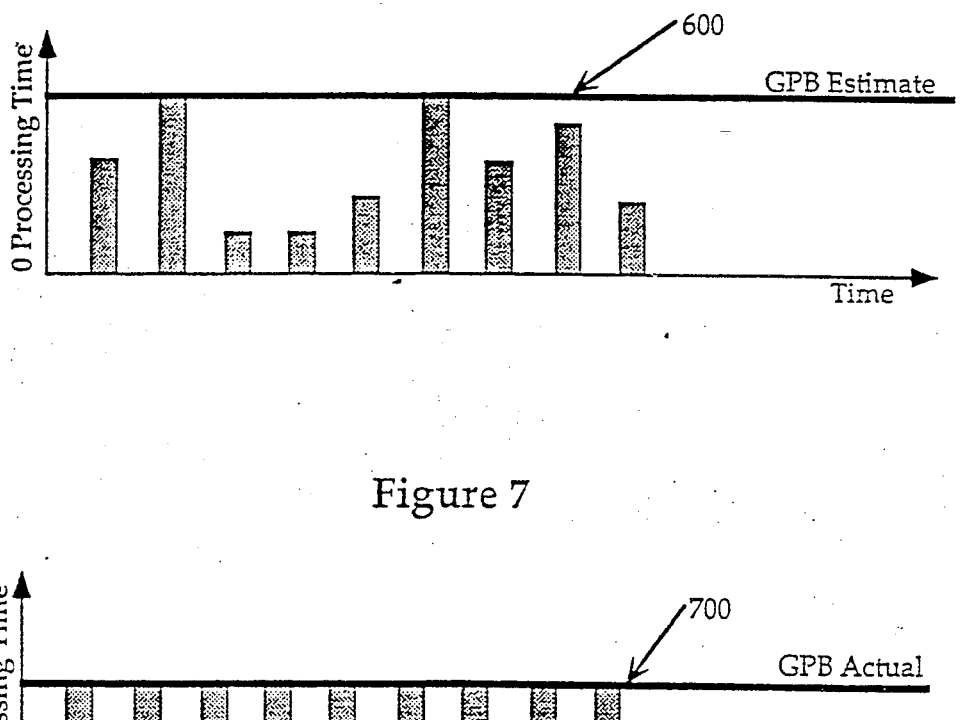

An alternative embodiment of simultaneous task activation/deactivation is shown in FIG. 18. Simultaneous task activation/deactivation process 1800 starts at entry point 1801 and it is determined at step 1802 whether the simultaneous task semaphore has been activated by one of the clients being serviced by the DSP. If the simultaneous task activation semaphore has not been activated by a client, then process 1800 proceeds to run the task at step 1807 and return at step 1809. However, if the simultaneous task activation/deactivation semaphore has been activated as determined at step 1802, then it is ascertained at step 1803 whether this client owns the semaphore. Any clients not owning the semaphore will be able to read the semaphore, however, they will not be able to modify the semaphore. Therefore, once a client owns the semaphore, and if a subsequent client seeks to access it, then step 1803 will lead to the end of process 1800 for this task. In short, the task is bypassed until the semaphore is either not activated as determined in step 1802, or it is determined that the client owns the semaphore.

If, however, the client checking the task activation semaphore does own the semaphore as determined at step 1803, then the toggle flag is checked at step 1804. The toggle flag instructs the DSP manager to "toggle" the state of the active flag. This is performed at step 1805. The active flag is used to activate the task. Thus, once a semaphore has been activated, the active flag will control the execution of the task. However, the execution of the task will only take place when the task active flag has been set. Otherwise, the task active flag is cleared, and task execution is halted. Therefore, the toggle flag provides a means for simultaneous task activation or deactivation depending on the state of the active flag. On a subsequent pass through process 1800, if the toggle is not set as determined at step 1804, then the task active flag is checked, and if set as determined at step 1806, then the task is run at step 1807, and process 1800 returns at step 1809. In a similar manner, once a task has been activated in a single frame as in a previous execution pass of process 1800, the task active flag can be toggled again as determined at step 1804 and performed at step 1805. Then, a subsequent pass through 1800 will determine if the task active flag is set at step 1806. If the task active flag is therefore cleared, then process 1800 will proceed to 1808 and the task execution will be halted. Then process 1800 may end at step 1809. At that point, the client may release the semaphore, and thus normal execution of all tasks in the real-time task list 610 may again be performed normally until another task obtains control of the task activation/deactivation semaphore.

Thus, a means for activating tasks simultaneously or in sequence in one or more task lists is provided by processes 1500, 1600, 1700, and 1800 as set forth above. Although this has been described with reference to specific flags and data structures, it can be appreciated by one skilled in the art that this may be implemented with various embodiments without departing from the spirit and scope of the present invention.

Thus, in summary, an improved method for task management in a processor has been provided. Although the present invention has been described particularly with reference to FIGS. 1 through 18, it will be apparent to one skilled in the art that the present invention has utility far exceeding that disclosed in the figures. It is contemplated that many changes and modifications may be made, by one of ordinary skill in the art, without departing from the spirit and scope of the present invention as disclosed above.

APPARATUS AND METHOD FOR ALLOCATING PROCESSING TIME IN A FRAME-BASED COMPUTER SYSTEM

FIELD OF THE INVENTION

The present invention pertains to the field of real-time processing in frame-based processing computer systems. More particularly, the present invention relates to an apparatus and method for measuring and controlling execution time in a frame-based computer system so that real-time tasks from different applications can be dynamically scheduled without conflicts on the processing system.

BACKGROUND OF THE INVENTION

Time correlated data such as sounds, images, speech, etc. are by their nature analog (i.e. continuous). However, computers are, for the most part, digital (i.e. discrete). In order for a digital computer to process analog signals, the analog signals are first converted into digital signals which represent the analog signals. This is accomplished by repeatedly sampling the analog signals in short time intervals and converting each sampled value into a digital value. The resulting digital signal can then be processed by the digital computer. The processing of such digitized signals by a computer is known as digital signal processing.

Presently, digital signal processing is being applied to multimedia applications whereby text, audio, speech, video, data communications, and other time correlated data are integrated to create a more effective presentation of information. However, handling these applications in a real-time environment requires a large amount of processing power. The computer's Central Processing Unit (CPU) typically does not have the requisite processing power. In order to handle the load associated with operating these tasks in real-time, one or more dedicated digital signal processors (DSPs) are employed.

A DSP is designed to accept incoming samples at the average rate that the samples are being generated by an input process. The DSP then processes the input samples according to a computer program and produces outgoing signals at the average consumption rate of an output process. One efficient method for performing real-time processing on a DSP is known as frame-based processing. In frame-based processing, time is divided into a series of discrete units known as "frames," within which all the required signal processing for that frame is completed.

This is accomplished by dividing digital signals into groups which represent the same amount of time as a frame. For example, given that Compact Disc audio data runs at a rate of 44,100 samples per second and assuming a frame rate of 10 milliseconds (100 frames per second), there would be 441 samples per frame. During each frame, the corresponding program code, variables, and input samples are loaded into a high speed cache. From the cache, the input samples are then processed according to the tasks. Finally, the resulting output data is dumped into an output buffer to be used by an output process.

In a frame-based architecture, each of the tasks is typically linked or associated with one another through a data structure. An interrupt or other timing signal is generated and sent to the DSP at the beginning of each frame. This initiates the processing of the data structure, such that each task is sequentially executed within a frame.

One of the advantages of frame-based processing is that it reduces the task switching overhead. For example, given four tasks each handling a sample stream of 44,100 samples per second, if each task must be run once for every sample, you have a total of 4·44,100 or 176400 task switches in a second. By implementing frame-based processing running 100 frames per second and given the same four tasks, each of which run 100 times in a second, requires only 400 task switches per second. This reduces the task switching overhead by a factor of 441.

One major drawback with a frame-based system is increased latency. A processing system that handles one sample at a time can respond in the next sample to a change in the input. In a frame-based system, a response takes two frames. This is because data is collected in one frame, processed in the next frame, and output in the following frame.

Another problem with frame-based systems is that, because each individual frame is of a fixed time duration, there exists only a certain, finite amount of processing time per frame. Consequently, when a number of tasks are being processed in real-time, it must be ensured that the frame's processing time is not exceeded. Otherwise, the real-time process will be disrupted in an unacceptable manner. Under certain circumstances, a frame's processing might be exceeded when executing the tasks to be processed during that frame. For instance, an unexpected aspect of one of the task's algorithms might cause that task to require more processing time, resulting in a frame overrun. Another example which might lead to a frame overrun is if a task is sensitive to input data, and the data has been corrupted or damaged. Indeed, an overloaded bus might deteriorate the system performance to a point whereby a frame overrun occurs. In some cases, such as debugging a program on a line-by-line basis, frame overruns are inevitable. Sometimes a task's algorithm might operate properly 99.9% of the time, but due to a defect, a particular command or data sequence results in an endless loop or an inordinate increase in processing time.

Ensuring that 100 percent of the frame's processing is not exceeded is relatively easy to implement if there is only one application running a single task. When the application is being written, the programmer can account for particular tasks and adjust the processing accordingly. In contrast, if a variety of multiple tasks are being installed and run by a number of different applications, a serious problem arises in determining whether there is enough processing power left in a particular frame for handling subsequent applications and/or tasks processing requests. Different hardware substantiations or configurations may also affect the processing load.

Thus, what is needed is an apparatus and method for determining 1) the processing time available within a frame when an additional task is about to be installed and 2) the worst-case processing time for that task. These two values can be compared to guarantee that when a task is installed, it can be fully executed within that frame. It would also be beneficial for the apparatus and method to be simple to implement, have low overhead, and also be dynamic (i.e., adaptive in real-time to the real environment).

SUMMARY AND OBJECTS OF THE INVENTION

In view of the problems associated with frame-based processing, one object of the present invention is to provide an apparatus and method for allocating a frame's processing time so that the time required to process real-time tasks associated with that frame does not exceed that frame's total processing time.

Another object of the present invention is to calculate the worst-case processing time for a group of modules for a task rather than simply adding together the processing times for the individual modules.

Another object of the present invention is to provide scaling vectors so that a piece of code can operate over various instantiations.

Another object of the present invention is to implement a frame-based allocation apparatus and method which is dynamic (i.e., adaptive in real-time to the real environment).

The currently preferred embodiment of the present invention also includes a second task list, called the timeshare task list. This task list is executed in any excess time within each frame that is not required to execute the real-time task list. This is referred to as timeshare processing. Another object of the present invention is to determine whether an application can be properly serviced on a timeshare basis.

These and other objects of the present invention are implemented in a frame based computer system which utilizes a digital signal processor for processing a plurality of tasks in a real-time environment. When an application requests that a particular task be processed in real-time, the present invention determines whether there is enough processing time available within each frame to process the task such that the frame's total processing time is not overrun. This is accomplished by first determining the task's processing time. A task is constructed of one or more processing modules. The task's processing time is calculated by adding together the time it takes to process the modules for a worst-case utilization situation. A modules' processing time is either an actually measured processing time (as measured by a timer) or an estimated processing time. Whether the actual or estimated value is used depends on the type of algorithm used in the module and the current status of the module. The present invention categorizes algorithms into three different types: smooth, smart-lumpy, and dumb-lumpy.

Next, the real-time task list's processing time is determined. The task list includes the tasks which have already been installed and will be executed within the frame. The task list's processing time is determined by adding together all the processing times of the installed tasks. The amount of processing time available is calculated by subtracting the task list processing time from the frame's total available processing for realtime. The additional task is installed in the task list if the frame's available processing time is sufficient to handle the additional task's processing requirement. Otherwise, a signal is generated to indicate that the task cannot be installed.

In addition, the present invention enhances the modularization of digital signal processing functions for various configurations by implementing scaling vectors. The scaling vectors enable one module to function in multiple instantiations. Furthermore, scaling vectors allow for a module's processing time to be dynamically varied, depending on the availability of the frame's processing time.

The present invention can also be used to aid in the determination of whether a particular task is serviceable on a timeshare basis.

BRIEF DESCRIPTION OF THE DRAWINGS

The present invention is illustrated by way of example, and not by way of limitation, in the figures of the accompanying drawings and in which like reference numerals refer to similar elements and in which:

Figure 1 illustrates a computer system as may be utilized by the preferred embodiment of the present invention.

Figure 2 illustrates a software system architecture as may be utilized by the preferred embodiment of the present invention.

Figure 3 illustrates a sequence of frames including the processing of a Sound Player task in one of the frames.

Figure 4 illustrates a programming structure having tasks in a task list and modules associated with each task.

Figure 5 is a chart of the GPB Actual value for a particular module.

Figure 6 is a chart illustrating the GPB Estimate value for a particular module.

Figure 7:
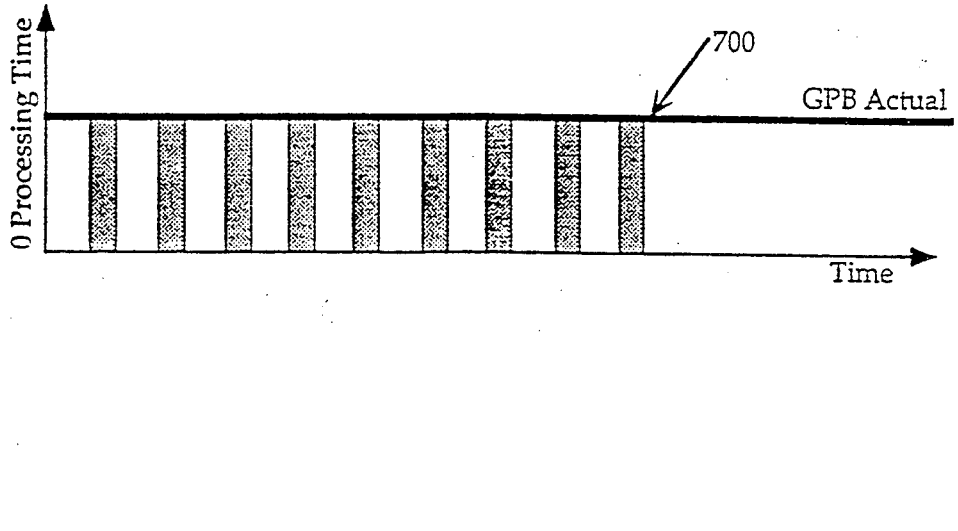

Figure 7 illustrates a smooth algorithm.

Figure 8:
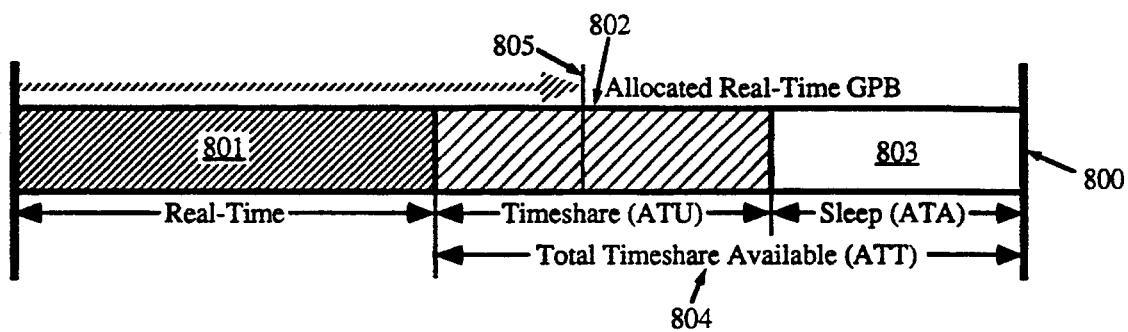
FIG. 8 shows the division of a frame into real-time and timeshare slices.

Figure 8 illustrates the states of the UseActualGPB flag and the DelayUseActualGPB flag in reference to the processing of a smart-lumpy module.

Figure 9 illustrates a Telephone Answering task comprised of grouped modules.

DETAILED DESCRIPTION

A method and apparatus for handling the allocation of real-time resources that is dynamic (i.e. adaptive to real-time in a real environment) is described. In the following description, for the purposes of explanation, numerous specific details such as register and buffer sizes, frequencies, frame lengths, timer values, sample rates, scaling vectors, GPB values, etc. are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview of a Computer System in the Preferred Embodiment

Referring to Figure 1, the processing system upon which the preferred embodiment of the present invention may be practiced is shown as 100. Apparatus 100 comprises a processing unit 110 which is, in this embodiment, a digital signal processor (DSP). For instance, 110 may be a DSP3210 Digital® Signal Processor, available from American Telephone and Telegraph (AT&T) Microelectronics of Allentown, Pennsylvania. DSP 110 is driven by a DSP clock 111 which provides a timing reference.

Processing system 110 is also coupled to an audio serial DMA (direct memory access) circuit 120 which facilitates transfers between a local memory 112 and/or information transferred on bus 150. In some embodiments, there is no local memory 112, so DMA circuit 120 may allow DMA transfers on bus 150. This may include information transferred via bus 150 from a host processor circuitry 160, and/or host processor memory (not shown). In addition, audio serial DMA circuit 120 provides output to an audio port such as 122 in a serial fashion as driven by a serial clock 121. DSP 110 is also coupled to a telecom port 112 for transmission of serial and bit input/output information, such as fax and/or computer data information transmitted over telephone lines.

Processing system 100 further comprises a bus control unit 140 which is coupled to DSP 110 and a bus interface circuit 130 which facilitates communication between 100 and bus 150. Bus 150 may be either the computer bus in which 100 is installed, or may be a host bus coupled to a host processor 160. Bus 150 may be coupled to other devices such as input/output units, memory, peripheral interfaces (not shown) for providing various capabilities within the system.

Processing system 100 shown in Figure 1 may be implemented as circuitry residing on a motherboard (main circuitry board) of a computer system or, in another embodiment, it may be implemented as an expansion card inserted into a slot in a computer system and thus communicate with host processor 160 over a communication bus 150. In one embodiment, host 160, bus 150, and processing system 100 may be one of the Macintosh® family of personal computers such as the Macintosh® II or Macintosh® Quadras manufactured by Apple Computer, Inc. of Cupertino, California (Apple and Macintosh® are registered trademarks of Apple Computer, Inc.). Host 160 may comprise one of the 68000 families of microprocessors, such as the 68020, 68030, or 68040 manufactured by Motorola, Inc. of Schaumburg, Illinois.

It should be noted that the structure of processing system 100 is shown as one embodiment and is not necessary for practicing the present invention. It should also be noted that in another embodiment, a plurality of additional DSPs may be coupled to a bus 150 such that a multiprocessing environment may be employed to provide enhanced capabilities. It will be appreciated by one skilled in the art that many departures and modifications of the circuitry shown in Figure 1 may be employed to practice the present invention.

Overview of the Software Architecture

The operating software for the preferred embodiment works on a team processing basis. In particular, careful attention is paid to the division of labor between the host processor and the DSP. The overall system architecture is illustrated in Figure 2. A host application or client 201 interfaces with a DSP Manager 202. The host application or client 201 represents either a specific application program or a higher level toolbox that is being accessed by a host application. The term client is commonly used to describe a relationship between a resource and a resource requestor. In this case, the resource being requested is the DSP processor. A toolbox refers to a predefined set of callable routines that carry out commonly used functions. Typically, such toolboxes are associated with a particular function (e.g. generating a graphical output). The host application may make use of the DSP functionality either directly by accessing the DSP Manager or through a higher level toolbox.

The DSP Manager 202 provides the host functionality through which host DSP applications are developed and controlled. The DSP Manager 202 further interfaces with a DSP Host Driver 204. The DSP Host Driver 204 executes on the host processor and provides specific hardware dependent functionality required to interface with a particular DSP processor and hardware implementation. The DSP Manager 202 further interfaces with a Shared Memory 218. The Shared Memory 218 may be defined in either or both local memory or main memory. Main memory is the system DRAM. Local memory may reside on a plug-in card, or on the main logic board, or may be defined as a portion of main memory. It is through this Shared Memory 218 that the DSP Manager 202 and the DSP Kernel 211 communicate.

In regards to the DSP processor, a DSP module 210 interfaces to the DSP Kernel 211. DSP module 210 represents a particular function or program that has been written for the DSP processor. The DSP Kernel resides in a storage location directly accessible by the DSP processor. The DSP Kernel 211 interfaces to a DSP Kernel Driver 212 and Shared Memory 218. The DSP Kernel Driver 212 contains hardware dependant routines and resides in local or system memory directly accessible by the DSP processor. The DSP Kernel Driver 212 communicates to the DSP Host Driver 204 via the Shared Memory 218 and through direct interrupts 219. The combination of the DSP Manager 202, DSP Host Driver 204, Shared Memory 218, DSP Kernel 211, and DSP Kernel Driver 212, comprises the DSP Operating System 220.

Programming Structures

The programming environment of the currently preferred embodiment of the present invention is comprised of three basic structures: sections, modules, and tasks. The basic structure for a DSP application is the section. A section contains information concerning the DSP executable code, data, variables, and input/output buffers. A number of sections are grouped together to form a module. Modules are provided to the host programmer as a resource and are loaded into a DSP task structure by using the DSP Manager. A module contains information for linking modules together and for controlling the execution of the module, thereby enabling the DSP Manager and the DSP Kernel to perform their functions.

Certain modules are grouped together to form tasks. Frequently, a DSP task will contain only one DSP module. The reason for forming a task is to place together in an appropriate order and with appropriate I/O buffer connections, all of the basic module functions required to perform a particular job. A further reason is to insure that the combined functions execute as a set, thereby providing consistent execution results. Tasks and their respective modules are started and stopped as a unit, installed and removed from the task list as a unit, and are built and connected to data streams as a single unit. A task is constructed by the host application programmer, using a series of calls to the DSP Manager. These calls create the task structure, load and connect modules in the desired arrangement, allocate the required memory, and install the completed task onto the DSP task list.

Guaranteed Processing Bandwidth

Figure 3 illustrates an example of time being sliced into a series of frames 311-315. Frame 313 is the current frame; frames 311 and 312 are previous frames which have already been executed; and frames 314 and 315 are future frames which will be executed following the execution of frame 313. Figure 3 also includes an example of a Sound Player task consisting of modules 316-321. Frame 313 has been enlarged to provide a more detailed view of the execution of the Sound Player task. The Sound -Player task's modules 316-321 processes and mixes three channels of sound (e.g. music, speech, and sound effects) by switching between five different modules 316-321 to sequentially process blocks of data through different algorithms. A CD-XA decompressor 316 is used to decompress compressed music or compressed speech. Next, a sub-band decoder 317 and an 8 to 24 kHz sample rate converter 318 are used to process speech that was compressed with telephone quality for a higher compression factor, and then up-convert to the system transport rate. A 22.2545 to 24 kHz sample rate converter is implemented for processing sound effects recorded at a rate different than the 24 kHz system rate. A 24 kHz audio mixer 320 is implemented to mix the three sound channels. Finally, the sound is output to the speaker FIFO in 321. Before and after each module execution, caching operations 323 with context switching are performed.

It can be seen that the Sound Player task 316-321 uses approximately half of frame 313. Other tasks could be run in the time remaining 322 in frame 313. However, it must first be determined whether each additional task can be completely executed within frame 313. Hence, whenever a client requests that a task be installed, the operating system needs to determine whether there is enough time available to process that additional task within the subsequent frames. The present invention accomplishes this by implementing a Guaranteed Processing Bandwidth (GPB) system.

The GPB system is comprised of a set of two registers and three flags associated with each module. These registers and flags pertain to and are stored with each module. The two registers are the GPB Actual Register, which stores the GPB Actual value, and the GPB Estimate Register, which stores the GPB estimated value. The three flags are the UseActualGPB flag, the DelayUseActual flag, and the DontCountThisModule flag. The calculations of these values and how the flags are set, as well as the functions and rationales behind each of these registers and flags, are explained below.

GPB Actual Register

The GPB Actual Register is initialized with the value 0. Whenever a module is run, the time required to process that module is calculated. This is accomplished by implementing a continually running timer. The timer is assumed to be counting at a rate proportional to the basic instruction rate of the processor (i.e., the DSP Clock 111 in Figure 1 supplies the clock for both the processor and the timer prescaler). Immediately prior to the DSP Kernel beginning to process a module, the timer value is read and saved. When the DSP Kernel completes processing the module, the timer value is, again, immediately read and saved. The difference between the first timer value and the second timer value determines the elapsed time required to process that first module. The elapsed time includes all system activities such as caching operations, I/O operations inherent in execution, set-up, the execution of the module, bus accesses, any clean-up process at the end (e.g. uncaching, saving back to memory, output operations, etc.) In other words, the elapsed time is the total time required to process that particular module. This actually measured process time is stored in the GPB Actual Register.

By adding together the processing times for each module in the task list, the task list's processing time can be determined. Figure 4 illustrates a typical programming structure wherein a task list 400 has tasks 401-403 ready for execution. Task list 400 is used to identify tasks waiting for execution. Task 401 is comprised of three modules 404-406. Task 402 is comprised of a single module 407. Lastly, task 403 is comprised of the two modules 408 and 409. Each module is comprised of sections (not shown).

The order of task execution is from top to bottom through the task list (e.g. 401, next 402, followed by 403). The order of module execution is from left to right. For example, with respect to task 401, module 404 would be executed first, followed by module 405, and finally module 406. The host application program specifies whether a task is active. If a task is not active, it is bypassed in the execution order. Similarly, the execution of a specific module may be bypassed by implementing a module skip mechanism.

Referring to Figure 4, when the DSP Kernel starts execution of task 401, the timer value, $t_0$, is read and saved. At the end of module 404, the timer value, $t_2$ is read and saved. The difference in time between $t_2$ and $t_0$ is the elapsed time 410. Elapsed time 410 is the time required to process module 404, which also includes all system activities as described above. When the DSP Kernel stops executing module 405, the timer value is again read and saved. The elapsed time 411 (i.e. $t_4-t_2$) is the time required to process module 405. At the completion of module 406, the timer value is again read and saved, $t_6$. The elapsed time 412, between $t_6$ and $t_4$, is the time required to process module 406. The time required to process task 401 is the cumulative times 410, 411, and 412. This procedure can be repeated for tasks 402 and 403 to determine the total processing time for task list 400. Note that timer value $t_6$ is the $t_0$ value for task 402.

If a task is inactive, the timing method described above adds the processing time to skip over the inactive task into the GPB value of the next module that executes. For example, if task 402 was inactive, the value $t_6$ would end up becoming the $t_0$ for task 403. Thus, the time to execute module 408 would include the time to skip over the inactive task 402. To avoid this, the start value used for a task should be reloaded from the timer if the previous task is inactive, rather than using the final value from the last module of the previous active task. This process in effect does not count the inactive task skip time. However, when the task is active, the processing load will be substantially greater than when it is inactive. The "inactive skip" processing time can thus be assumed to be included as part of the active processing time.

Every time a module is processed, the above measuring procedure is performed on that module to determine the time required to process that module. The actual measured module processing time is compared to the value in the GPB Actual Register. The larger of these two values is stored in the GPB Actual Register. This results in a peak detection algorithm, wherein the maximum actual GPB used, including bus and I/O variations, is maintained in the GPB Actual Register. In other words, the GPB Actual value gives the worst case processing time that is being used by that module, up to that point in time.

Figure 5 is a chart which illustrates the GPB Actual value for a sample module. The y-axis is the measured actual processing time used by a particular module. The x-axis represents real time. The GPB Actual Register is initially loaded with a value of 0. The module is processed a number of times, as indicated by the shaded rectangles. Each time the module is processed, the actual processing time is compared with the value in the GPB Actual Register. If the actual processing time is greater than the value in the GPB Actual Register, the actual processing time replaces the value in the GPB Actual Register. This results in a GPB Actual value 500. Note that the GPB Actual value 500 is updated after the latest value is computed and after the module completes execution of that frame.

GPB Estimate Register

Each module also has an associated GPB Estimate Register. The GPB Estimate Register is initially loaded with a GPB Estimate value by the DSP programmer or by automatic profiling tools. The GPB Estimate value is the estimated maximum level of processing time that could be used by that module. An estimated value is used because certain portions of the processing time depend on bus latency and other factors, such as different machines or implementations, or even for the same machines when users reconfigure them with optional add-in expansion cards. Figure 6 is a chart which illustrates the GPB Estimate value 600 for a particular module. The GPB Estimate value can be determined experimentally, calculated by the DSP tools, or profiled in reference to a timer.

In the currently preferred embodiment, the processing times are measured as a function of instruction cycles. By using DSP instruction cycles as the unit of measurement, the execution time adjusts to the speed of the particular DSP being used. For example, with 10 millisecond frames, 166,666 cycles are available at 60 nanosecond instruction cycles and 125,000 cycles are available for 80 nanosecond instruction cycles. Consequently, if a processor is operated at 60 nanosecond instruction cycles, instead of 80 nanosecond instruction cycles, more instruction cycles would be available for that particular frame. The processing speed is known by the DSP driver for that particular hardware implementation. When the DSP Kernel is computing the processing time available, it requests this information from the DSP Driver and is factored into the calculations. The values stored in the GPB Actual and GPB Estimate Registers are in reference to processor instruction cycles. Thus, when processing times are described, it is in reference to DSP instruction cycles.

Algorithm Categories

The GPB Actual and GPB Estimate Registers are used differently, depending on how the module's algorithm is categorized. Module algorithms are broken into three separate categories: smooth, smart-lumpy, and dumb-lumpy. A smooth algorithm is one that consistently takes approximately the same amount of time to execute per frame. The discrepancies in execution times for different frames are due to minor variations within the algorithm and also due to variations outside the control of the algorithm, such as I/O processing handled by the DSP Kernel and bus overhead, which varies depending on the amount of bus traffic. These discrepancies should be kept to within a few percent in order to qualify as a smooth algorithm. Figure 7 illustrates a smooth algorithm. Some examples of smooth algorithms include algorithms for implementing Finite Input Response (FIR) and Infinite Input Response (IIR) filters, equalizers, echo processors, etc. Generally, a smooth algorithm does some fixed amount of processing with little or no decision making.

A lumpy algorithm is characterized by periods of heightened activity. A lumpy algorithm might use various amounts of processing time for each frame. The processing time varies depending on the data being processed, the status of the function the module is processing, and other variables. Figures 5 and 6 depict lumpy algorithms.

A smart-lumpy algorithm is an algorithm which has the ability to determine, programmatically, the instances when it is executing code that results in its using maximum processing time. An example of a smart-lumpy algorithm is a multi-rate modem. A multi-rate modem has various stages, such as initialization, setup, and data transfer. The maximum processing time is usually associated with the steady state data pump. In the preferred embodiment, when the maximum processing time situation occurs, the smart-lumpy algorithm initiates a call to the DSP Kernel, which then sets the UseActual GPB flag. The DSP Kernel does not actually set this flag until the GPB calculations for that module are completed. This aspect will be explained in greater detail below.

A dumb-lumpy algorithm is an algorithm which does not have the ability to determine, programmatically the instances when it is executing code that will result in its using maximum (or beyond maximum) processing time. An example of a dumb-lumpy algorithm is analogous to a Huffman decoder. A Huffman decoder takes longer to decode certain types of bit streams than other types of bits streams. The processing time can even grow unbounded in the worst case scenario, where random noise is input. A separate mechanism is provided to manage this type of algorithm. In the preferred embodiment, this is handled by adding two DSP Kernel calls - one to find out how much processing time is alloted (via the GPB Estimate), and the other to determine how much has already been used. It is therefore up to the DSP programmer to ensure that the dumb-lumpy module does not exceed its allocated processing time.

How the GPB is Used

When a request is made to install a task in the real-time task list, the DSP Manager determines whether there is enough processing time available per frame at that time. When an application calls the DSP Manager to request the installation of a task, the current GPB available is calculated. The determination is made by comparing the estimated processing time for that task to the remaining processing time available in the frame. The remaining processing time is calculated by subtracting the GPB Actual or Estimate values for the modules corresponding to tasks already installed from the total processing time available for that frame. If there is enough processing time available, the new task will be installed. Otherwise, an error message will be sent back to the application or client attempting to do the installation and the task will not be installed. Optionally, the DSP Manager may request GPB from its existing clients first, and if any client returns GPB to the system, an error message may be unnecessary.

The determination of whether to use the GPB Actual value or the GPB Estimate value is described as follows. In the case of smooth algorithms, the UseActualGPB flag is set in the source code for the module. The initial state of the flag is indicated in the module data structure. Since the UseActualGPB flag is set, the GPB Actual value is used as the correct current processing time for the module. However, if the GPB Actual value is zero, the GPB Estimate value is used instead in the calculations. In other words, the GPB Estimate value is used until the module has a chance to run at least once. After that, the GPB Actual value is used, irrespective of whether it is smaller or larger than the GPB Estimate value. In the currently preferred embodiment, the GPB Actual value is updated (peak algorithm) for a module each time that particular module is executed. In this manner, the GPB system adapts to different CPU configurations and realtime variations, such as bus loading.

In the case of smart-lumpy algorithms, the UseActualGPB flag is not initially set because the GPB Actual value is meaningless until the maximum processing time situation is reached. Since the UseActualGPB flag is not yet set, the GPB Estimate value is used as the correct current processing time for this module. However, if the GPB Actual value is larger than the GPB Estimate, the larger value is used. This condition occurs whenever a module has not quite reached its worst case but already has exceeded the estimate. When a smart-lumpy algorithm determines that it has reached the maximum processing time situation, it makes a call to the DSP Kernel to set the DelayUseActualGPB flag.

The reason why a DelayUseActualGPB flag is required is because if the DSP Manager happens to interrogate the GPB values between the time the Kernel call is made by the DSP module and when the latest GPB Actual is calculated at the exit from the module, it will retrieve an erroneous GPB Actual value. This is due to the fact that, at that instant in time, the GPB Actual Register still contains the previously stored actual value. The actual value for the current scenario has not yet been updated.

Hence, a DelayUseActual flag is required. Figure 8 illustrates how the UseActualGPB flag 800 and the DelayUseActual flag 801 are used and set in reference to the processing of a smart-lumpy module. Some length of time after frame start boundary 803, the processing of a smart-lumpy module begins at time 804. Processing continues until time 805. The DSP module calls the DSP Kernel to set the UseActualGPB flag 800 at time 806. The call causes the DelayUseActual flag 801 to be set. Note that the UseActualGPB flag 800 is kept in the off state (not set). A short time after the module has been processed, the GPB Actual value is determined and stored in the GPB Actual Register at time 807. The DSP Kernel then checks the DelayUseActual flag 801 at a later time 808. If that flag is set, then the UseActualGPB flag 800 is set and the DelayUseActual flag 801 is reset to the off state (not set). Thus, if the DSP Manager happens to interrogate the GPB value in the middle, while the module is being processed, the GPB Estimate value will be used rather than an erroneous GPB Actual value (unless the GPB Actual is already larger than the GPB Estimate). Once the GPB Actual Register has been properly updated, the GPB Actual value will then be used. This updated GPB Actual value is used thereafter, and the value is additionally updated if required by the previously described peak algorithm.

An alternate method for handling the flag setting is to require the DSP programmer to set the UseActual flag the next frame after the maximum processing has occured, via the Kernel call. This is functionally correct, but adds programming burden to the DSP programmer, and increases the potential for error.

As briefly described earlier, in the case of dumb-lumpy algorithms, the algorithm makes two calls to the DSP Kernel. One call fetches the expected processing time for that module, which is stored in the GPB Estimate Register. The other call fetches the amount of processing time which has been used up to that instant. The algorithm compares these two values. If the algorithm is close to exhausting its allotted time, the module should execute its processing termination procedure (e.g., aborts for this frame). This procedure should end the processing in a manner appropriate for that particular module. By repeatedly making the second of these two calls, the algorithm is provided with information to determine when it should terminate its execution. Thus, a dumb-lumpy is required to manage its alloted processing time itself.

If a dumb-lumpy overruns its allotted time, the GPB Actual will exceed the GPB Estimate. This is actually a fairly likely situation, in that the programmer can only make an educated guess at how much time is required to complete the context switch when exiting his module. As previously described, this larger value will be used when computing available GPB when another client wishes to install an additional task. This guarantees that the additional context switch time is included in future GPB availability calculations.

Thus, the calculation of remaining processing time proceeds by adding up all of the current processing requirements of each installed module as described, and subtracting the total processing from the available frame processing. Note that this calculation includes both active and inactive tasks. This is necessary so that the required processing time for inactive tasks is reserved for when they are activated.

Once a task and its related modules have been used for the desired purpose and the application prepares to quit, the task is unloaded from the task list, automatically returning its GPB to the system for use by other modules. At this time, smooth and smart-lumpy algorithms have a more accurate GPB value stored in their GPB Actual register. This value reflects the real execution time for the current environment. The application can choose to update the module on disk with this new actual value by storing it in the GPB Estimate, effectively updating the estimate. This operation is performed by the DSP Manager on request from the client. Alternatively, the DSP Manager may automatically do this for the client. However, there are drawbacks in this approach, such as dealing with locked disk files; updating applications with DSP resources in them which alters their "modification" dates; or multiple users updating a shared DSP resource on a file server.

In the preferred embodiment, a "preferences" file is maintained by the DSP Manager on that particular systems boot disk. Whenever a task is unloaded, any improved GPB values in the modules within the task are written to the preferences file. Whenever a module is loaded, the preference file is checked to see if more accurate information is available, which is used instead. This eliminates the problems associated with file servers and modification dates for applications.

Note that the availability of an updated GPB Estimate in the preferences file indicates that the module has been used previously in this particular computer system. This also indicates that the GPB Estimate has been adjusted to reflect the performance of this computer system, and is therefore significantly more accurate than the GPB Estimate in the module file. This distinction can be utilized to reduce frame overruns. In particular, the DSP Manager can add some percentage to the GPB Estimate for a module if nothing is found in the preferences file when comparing the estimate and the available processing time. This extra margin can reduce the likelihood of the estimate being too low for this machine. Alternatively, this extra margin can be added only if the reamining processing available is close to the required processing as indicated by the estimate.

It is this update mechanism that provides the last step to close the loop in the system, to make it truly an adaptive system. Note that this process only has meaning for smooth and smart lumpy modules. Dumb lumpy modules are required to limit their processing to the estimated value themselves.

Grouped Modules

The currently preferred embodiment of the present invention utilizes a component architecture approach, wherein generic modules for performing generic functions can be intercoupled to provide different functionalities. An example of this building block approach is that of a telephone answering machine, as shown in Figure 9. The Telephone Answering task 901 can be implemented by grouping together standard modules 902-904. Status module 902 provides the status and controls functions such as detecting rings, taking the phone line off-hook, hanging up the phone, etc. Next, Sub-Band Decoder module 903 is used to provide a player function for playing a greeting to the caller and for playing back any recorded messages. The Sub-band Encoder module 904 is used to provide a recorder function.

The Telephone Answering task 901 does not actually uses all of its modules 902-904 simultaneously. For example, when a message is being played, the recorder function is idle and vice versa. Thus, calculating the GPB values for this task by adding up the processing times for each module would result in an over-estimation because not all modules will be executed in the same frame. This would effectively lock out real time processing bandwidth from other tasks, which would never actually be used. For example, if the GPB values for Status module 902 were 1,000 cycles; Sub-band Encoder module 903 were 5,000 cycles; and Sub-band Decoder module 904 were 6,000 cycles; this results in a total GPB value of 12,000 cycles. The worst-case situation is actually 7,000 cycles (Status module 902 plus Sub-band Decoder module 904). Thus, Telephone Answering task 901 does not need an allocation of 12,000 cycles. Rather 7,000 cycles is all that is required.

In order to make more efficient allocation of processing time in this type of situation, the currently preferred embodiment of the present invention utilizes a DontCountThisModule flag. When a request is made to determine the processing time for a particular task, the DSP Manager checks each of the task's modules to determine whether this flag is set. If the DontCountThisModule flag is set for a module, the GPB value of that particular module is not included in the total GPB value for that task. It is the responsibility of the client installing the task to determine the worst case utilization of the modules and to set the DontCountThisModule flags for the relevant modules. Hence, in the example given above, the DontCountThisModule flag is set for the Sub-band Encoder module 903.

Note that if the programmer incorrectly uses the DontCountThisModule flag, the GPB used by the task list will be incorrectly calculated too low, allowing the installation of additional tasks when none may be in fact desireable. In this case, a frame overrun may result. One way of correcting this problem is to maintain a GPB Actual register in the task structure for a task-level check on the processing load. This additional measurement allows better error correction and recovery if this mistake was made by a programmer.

Scaling Vectors

Another aspect of the present invention which enhances modularized DSP functions in various configurations is the use of scaling vectors. Scaling vectors enable one module to function in multiple instantiations. In other words, scaling vectors enable generic modules to adapt to various buffer sizes, sample rates, and frame rates. Various GPB values are also implemented to correspond to the various instantiations. For example, a module which has a GPB value of 5,000 cycles at a frame rate of 100 frames per second may require only 2,700 cycles at 200 frames per second. Instead of having to create a set of functionally identical modules for each possible case, a single module can be implemented with scaling vectors that allows it to be used in all of the desired cases.

When a module is first programmed, the programmer determines the different ways that the module can conceivably be used and also determines the respective GPB values for each different implementation. The programmer then enumerates the possibilities as a list of scaling vectors. The list is stored with the module. When an application attempts to use the module a certain way, the loader determines, from the module's scaling vector list whether that module can be used for that instantiation. The loader also selects the GPB value for that instantiation.

A scaling vector is comprised of three values: a frame rate, a scale factor, and a GPB value. The scale factor is used to determine the size of scalable I/O buffers for a particular module. Table 1 below illustrates some possible applications for a 2-to-1 sample rate converter.

Table 1

| | |
|---|---|
| 100 frames/sec | 24 kHz to 12 kHz |
| 200 frames/sec | 24 kHz to 12 kHz |
| 100 frames/sec | 8 kHz to 4 kHz |
| 200 frames/sec | 8 kHz to 4 kHz |
| 100 frames/sec | 16 kHz to 8 kHz |
| 200 frames/sec | 16 kHz to 8 kHz |
| 100 frames/sec | 48 kHz to 24 kHz |
| 200 frames/sec | 48 kHz to 24 kHz |
| 100 frames/sec | 32 kHz to 16 kHz |
| 200 frames/sec | 32 kHz to 16 kHz |

Since this module is a 2-to-1 converter, the size of the scalable input buffer in the source code should be set to 2, and the scalable output buffer should be set to 1. Table 2, shown below, gives the ten corresponding scaling vectors.

Table 2

| | |
|---|---|
| 100, 120, 5000 | 100 f/s, scale=120 for I/O size of 240/120, GPB=5000 |
| 200, 60, 2500 | 200 f/s, scale=60 for I/O size of 120/60, GPB=2500 |
| 100, 40, 1666 | 100 f/s, scale=40 for I/O size of 80/40, GPB=1666 |
| 200, 20, 833 | 100 f/s, scale=20 for I/O size 40/20, GPB= 833 |
| 100, 80, 3333 | 100 f/s, scale=80 for I/O size of 160/80, GPB=3333 |
| 200, 40, 1666 | 200 f/s, scale=40 for I/O size of 80/40, GPB=1666 |
| 100, 240, 10000 | 100 f/s, scale=240 for I/O size of |

| 71 | 72 |
|---|---|
|  | 480/240, GPB=10000 |
| 200, 120, 5000 | 200 f/s, scale=120 for I/O size of 240/120, GPB=5000 |
| 100, 160, 6666 | 100 f/s, scale=160 for I/O size of 320/160, GPB=6666 |
| 200, 80, 3333 | 200 f/s, scale=80 for I/O size of 160/80, GPB=3333 |

When an application requests that a module be loaded, a call is made to the DSP Manager. One of the parameters provided to the DSP Manager in the call is the scale factor. The DSP's current frame rate is provided automatically. If there is a matching scaling vector, the module's scalable I/O Buffers are scaled appropriately, and the corresponding GPB value is used. Note that a scalable buffer flag is included in the buffer flags to indicate if scaling is to be performed. For example, if the 200,80,333 vector is chosen from Table 1, then the I/O buffer sizes would be multiplied by 80, the scale factor. This would make the input buffer (initially size 2) big enough for 160 samples, and the output buffer (initially size 1) big enough for 80 samples - perfect for a 2/1 sample rate convertor running at 200 frames per second and processing 32 KHz data.

If there is no matching scaling vector, an error is returned. Note that the module algorithm requires knowledge of the buffer size at run time to determine how much processing is required. A DSP Kernel call or macro must be provided to provide buffer size information to the module on request.

Table 2 indicates a simple, linear relationship between buffer size (scale factor) and GPB. If this were really the case, only a single value would be needed -- the GPB per unit of scale factor. In reality, the GPB value consists of a certain amount related to loading and handling of the module and its buffers and a processing load that is often, but not always, a linear relationship to the I/O buffer size or scale factor. Since the GPB values are related to the scale factor in a more complex way, each of the GPB values in the scaling vectors should be initially estimated as shown in Table 2, and then more accurately measured in an actual system with some form of profiler tool.

The GPB Estimate update technique described earlier (i.e. the preference file) can also be supported with scaling vectors. This is accomplished by the DSP Manager keeping track of which scaling vector was being used, and updating only the related GPB Estimate.

In an additional embodiment, for applications which do not know the details of a module but which, nevertheless, wish to use it as a generic building block, a DSP Manager call is provided to retrieve information concerning the module. The call can be used to select the desired scale factor. The call returns the available input and output buffer sizes at the current frame rate, and the scale factors. This list is limited to scalable I/O buffers specified by the module programmer. The application must make a selection based on the required I/O buffer sizes. The associated scale factor is then passed to the loader.

Dynamic Processing Time

The execution of certain programs could take all or a great majority of a frame's processing time under certain circumstances. Under other circumstances, these same programs could take substantially less processing time to execute. The currently preferred embodiment of the present invention dynamically varies the processing time for a particular module, depending upon the availability of the processing time.

The present invention accomplishes this through the use of the scaling vectors. When a module is written, the programmer can generate, not just one, but a number of various GPB values for a given frame rate and scale factor. The different GPB values for the same frame rate and scale factor represent different levels or modes by which that particular module could be executed. Thus, when a module desires more processing time, the application can make a call to the DSP Manager to determine whether additional time is available. If additional processing time is available, a specific scaling vector having a larger GPB value can then be selected and used by that module. Alternatively, the scaling vector having the largest GPB value which could be loaded (i.e., fits into the available processing time) is selected and used by that module.

A similar process is used to give up unneeded processing time. Note that the application is responsible for informing the module via Shared Memory when the GPB level is changed. Likewise, the module can request a change of processing by setting values in Shared Memory for the client to read (polling mode) or send a message to the client (interrupt mode). Thereby, a particular module can have different execution levels, depending on the availability of processing time.

In the preferred embodiment, a mechanism is established between the module, the client, and the DSP Manager to effect these GPB "mode" changes. This mechanism is comprised of a single 32-bit word in shared memory. The upper 16-bits is read/write for the host, and contains the desired mode number. The lower 16-bits is read/write for the DSP, and contains the current actual mode number. Both processors may read the entire 32-bit word.

At any given time, the desired mode can be set by the host, assuming the proper GPB calculations have been preformed. The DSP Manager can then query the actual mode, and handle the mode change when the DSP module finally makes the mode switch. Note that the mode change can be instigated by either the DSP module (via a message to the client) or by the client. In either case, it is the client that actually makes the DSP Manager calls to effect the change. It is then the responsibility of the DSP module to activate the new mode when it reads the mode change in shared memory, and to indicate when the mode change is complete by storing the new mode number in the shared memory.

The mode change is accomplished by the client making a call to the DSP Manager, specifying the desired mode number. The DSP Manager fetches the GPB value for this mode from the scaling vector, and determines if it is an increase in GPB or a decrease. If a decrease is indicated, the new mode number is set in the shared memory, and a deferred task is set up to query the shared memory to detect when the module has changed modes. The GPB Estimate is changed to reflect the new, lower value. The GPB Actual is left as is for the moment. Control is then returned to the client. Under the control of the deferred task, the shared memory is checked until the module makes the mode change. When this takes place, the GPB Actual is saved for use in updating the preference file later, and is set to zero. This allows the new, lower GPB Actual value to be computed, using the standard peak algorithm described previously.

If a GPB increase is determined from the requested mode change, than an internal DSP Manager call is made to determine whether enough GPB is available to handle the increase request. If there is sufficient GPB, the required GPB is taken, and the GPB Estimate is revised upward, using the value in the new mode's scaling vector. The GPB Actual is saved for updating the preference file at a later time. Control is then returned to the client. If there is not enough GPB available, the DSP Manager can request GPB from all current clients. If a client gives up some of its GPB, and the result is that sufficient GPB is now available, the process completes as described. However, if there is no way to get the needed GPB, then an error is returned to the client. The current mode is therefore not changed.

Note that the format of the scaling vectors to handle multiple modes is a simple extension of the basic scaling vectors. The vectors can be arranged in any order, which allows grouping by mode, by frame rate, or by sample rate, depending on the programmer's desire. There are alternate methods for encoding the modes, which have some value, but require additional intellegence in the tools. For example, the scaling vector could be variable size, and contain the frame rate, the scale factor, and a GPB mode count, followed by that number of GPB values for the different modes. This could make it easier for programmers to keep track of modes. Alternatively, scaling vectors could have four values: a mode number could be included with each vector. This could potentially prevent some programmer errors.

The following example of a modem module illustrates how its processing time can be dynamically varied, depending on the availability of processing time. Presently, modems can operate over a wide range of different speeds -- for example, 1200 baud with V.22 to 9600 baud with V.32. Furthermore, various other modem speeds also exist and may be developed in the future. Generally, the faster the operating speed, the more processing time is required. In other words, the modem module requires more processing time to handle a V.32 call versus a V.22 call. Hence, the modem module can have various GPB values, depending on the desired operating speed. The different GPB values are reflected in the scaling vectors for the modem module. Table 3 shows five different GPB values which correspond to five different operating speeds, given a frame rate of 100 frames/second and a scale factor of 20.

Table 3

| Operating Speed | Frame Rate | Scale Factor | GPB Value |
|---|---|---|---|
| V.22 | 100 | 20 | 4000 |
| V.22 bis | 100 | 20 | 4500 |
| V.29 fax | 100 | 20 | 7000 |
| V.32 | 100 | 20 | 9000 |
| V.32 bis | 100 | 20 | 9500 |

Supposing that the modem module is initially set up with a minimum requirement to operate on V.22 (GPB of 4000 cycles). When the phone rings, the modem module requests additional processing time in case the incoming call is V.32 bis (GPB of 9500 cycles). It does this by sending a message to the modem client. The client requests the mode change by calling the DSP Manager. The DSP Manager looks up the new mode's vector, and determines that an additional 5500 GPB cycles are required to switch to that mode. It then determines whether the extra 5500 cycles are available. If the additional processing time is available, the modem module is notified via shared memory and implements the scaling vector corresponding to V.32 bis: 100,20,9500. The DSP Manager takes care of the GPB Estimates and GPB Actual values, as described earlier.

The modem module now has a GPB value of 9500 rather than 4000. The phone is answered. If the incoming call happens to be V.32 bis, the modem module has enough processing time to handle the call. However, if the incoming call happens to be V.22 bis, the modem module falls back to a GPB value of 4500 by implementing the V.22 bis scaling vector: 100, 20, 4500. This is done by sending a message to the modem client, which then requests the GPB change from the DSP Manager. After the incoming call has been completed, the modem module relinquishes the extra processing time using the same mechanism by reverting to the V.22 scaling vector 100, 20, 4000.

Note that in this example, if insufficient GPB is available to shift above V.22, the modem answers the phone as a V.22 modem, forcing any higher speed calling modem to fall back to V.22. This process allows dynamic allocation of DSP resources, depending on the load at any given time from user demands.

An alternative embodiment is to implement scaling vectors for calculating a more accurate initial GPB Estimate value for a module. This results in a more accurate initial GPB Estimate value. First, the Host Driver provides the hardware implementation data on transfer times (measured in nanoseconds) required for different types of memory references. The access time is the average real-time duration from the time a data request is made to the time the data is actually received and the transaction is terminated. Bus and memory performance is accounted for in the transfer time. Next, the number of memory accesses for each type of memory reference for the module is determined. This can be determined by one of three different methods. One method is for the programmer to compute these numbers.

In an second method, the development hardware can actually count the number of times that each type of memory reference is accessed by the module for a frame. In yet a third method, the time to perform one particular type of memory reference can be slowed. The total time required to process the entire module with one type of memory reference slowed is measured. The regular time (not slowed) for processing the entire module is subtracted. The resulting time differential is then divided by the difference between the access time for one slowed access and one regular access for that particular type of memory reference. The result yields the number of accesses for that particular type of memory reference for that module. This method is repeated for each different type of memory reference.

Once the numbers are known, the total time for each type of memory reference for the module can be calculated by multiplying the number of memory transfers of that particular type by the time required to perform that particular type of memory transfer. Afterwards, the estimated processing time for the entire module is determined by adding together the times for each type of memory reference. This estimated processing time is then converted into a GPB value by dividing it with a real-time/GPB ratio.

Table 4 below illustrates an example of deriving a GPB Estimate value based on this type of scaling vector.

Table 4

| Memory Access Count ($N_i$) | Type of Memory Reference | Access Time (ns) |
|---|---|---|
| $N_1 = 10,000$ | Cache Memory | 72 |
| $N_2 = 205$ | Local Memory - Single | 200 |
| $N_3 = 117$ | Local Memory - Page or Block Transfer | 150 |
| $N_4 = 82$ | System Memory - Single | 1200 |
| $N_5 = 41$ | System Memory - Page or Block Transfer | 1000 |

Given a computer system having five different types of memory references, the average access time for each type of memory reference is determined. Note that other types of computer systems can include additional types of memory references. For a particular module, the number of times that module performs that type of memory reference is calculated (memory access count $N_{1-5}$). The scaling vector now comprises seven numbers: the frame rate, the scaling factor, and $N_{1-5}$. The total time for processing the module can be calculated based on the scaling vector as follows: $(10,000 * 72) + (205 * 200) + (117 * 150) + (82 * 1200) + (41 * 1000) = 917,950$. Given a real-time/GPB ratio of 72, the GPB Estimate value for this particular module is 12,749. Note that the ratio used is the counting rate of the timer, and usually equals the time of $N_1$ counts.

One negative aspect of this alternative embodiment is that even though the GPB Estimate value is initially more accurate, it cannot subsequently be updated based on GPB Actual values. In other words, there is no feedback mechanism to close the loop. Thus, this alternative provides a more accurate initial estimate but cannot adapt to additional changes introduced into the system by the user, such as expansion cards, etc. The preferred embodiment ultimately results in a more accurate estimate.

Another alternative embodiment involves calculating the GPB value for a particular module based on the following equation: $GPB = mx + b$, where "m" corresponds to the incremental amount of time for each additional sample to be processed, "x" is the number of samples, and "b" corresponds to the overhead time such as caching, context switching, and program set up times. For a more accurate GPB value, this alternative embodiment can also incorporate the scaling vector concept described in the previous alternative embodiment. That is, different "m" and "b" values are used corresponding to the different types of memory references. Since the scaling vector contains the number of accesses for each type of memory reference, the total GPB value for the module is the sum of the GPB values for each type of memory reference (as calculated according to the formula given above: $GPB = mx + b$). However, this alternative embodiment is limited to modules having a relatively linear processing load with respect to the number of samples which are processed.

Timeshare

In addition to processing tasks in real-time, the currently preferred embodiment of the present invention processes tasks on a timeshare basis. Real-time tasks are those tasks which are executed at regular intervals (i.e. each frame). In contrast, timeshare tasks need not be executed every frame. Some examples of tasks which can be processed on a timeshare basis include compression of disk files, graphics, animation, video decompression, etc.

Timeshare tasks are processed at the end of frames which have processing time left over, after all of its real-time tasks have already been processed. The amount of processing time available for timeshare in a particular frame depends on how many real-time tasks are being processed and their respective processing times. If the real-time tasks consume all the processing time of a frame, no timeshare tasks can be processed in that frame. On the other hand, if no real-time tasks or minimal real-time tasks are being processed during a particular frame, there would be a great deal of processing time for timeshare tasks during that frame.

Before a task is to be processed on a timeshare basis, it should first be determined whether that task can properly be serviced on a timeshare basis, due to the fact that the total timeshare available varies from frame to frame. The DSP Kernel knows how much processing time is available per frame, since it is computing the GPB Actuals for all of the realtime tasks. The average total remaining (unused) realtime available for use by timeshare may be computed as follows: for each frame, recompute the average time remaining after all real-time tasks have completed. A form of moving average calculation is utilized, such as:

Average timeshare = previous average value · 0.9 + current frame value · 0.1.

This gives each new frame's remaining time a 10% weight, against a weight of 90% on the previous average. Alternate averaging techniques can be used. Also, it is possible for the DSP Manager to do this calculation by sampling the value every n frames. While this may not be as accurate, it simplifies the Kernel.

Since there may be a substantial context switching overhead when switching between realtime and timeshare and vise versa, this amount should be subtracted out to give a more accurate value of real processing available. This value should be provided by the Host Driver to the DSP Manager. Note that the context switch overhead is the minimum amount of time that must be available before any timeshare tasks can be installed. Normally, if no timeshare tasks are installed, all of the available frame time can be allocated by realtime tasks. If there is still the minimum time available, a timeshare task may be installed, otherwise an error will be returned. Once there are tasks in timeshare, the realtime allocation can never exceed the total time minus the minimum required context switch time. In effect, installing the first timeshare task allocates some of the processing bandwidth for timeshare context switch. If all timeshare tasks are removed, this time can be allocated to realtime tasks.

In addition to the average available timeshare processing, the frequency of the timeshare task list execution is required. If there are many tasks in the timeshare task list, execution frequency for each task will be low. A measure of this can be computed by calculating a moving average of the number of frames required to completely process the timeshare list once. This must be done each time through the timeshare task list. The calculation could be done as follows:

frames used = ending frame number - starting frame number

Average frames used = previous average frames used * 0.9 +
         current frames used* 0.1

Note that it is possible to have a "frames used" value of zero for cases where few timeshare tasks are active or installed, or where most of the processing time is available for timeshare. This will result in an average frames used value of less than 1.0. Other averaging methods may be used. The average frames used value could alternately be computed by the DSP Manager by sampling the realtime and timeshare frame numbers on a regular basis. This will be less accurate, but reduces the Kernel complexity.

By using the average frames used and the average available timeshare processing per frame, the frequency in which a new timeshare task will be executed can be computed as follows:

current timeshare load   = Average timeshare + proposed timeshare load  Average frames used
         = current timeshare load +

GPB Estimate of task computed frames used = proposed timeshare load/Average timeshare If the calculated "proposed" frames used is too high (infrequent) for the desired function, the task should not be installed in the timeshare list. Note that a timeshare client must monitor the processing rate of its timeshare tasks because change in the real-time load or in the timeshare task list affects the amount of processing its timeshare task receives. This process can be assisted by notifying a timeshare client whenever a new real-time task is added to the task list. Another technique for monitoring timeshare processing rate is for the client to request the timeshare frame number from the DSP Manager. The number is incremented once for each pass through the timeshare task list. Another aid to timeshare management is to provide the unallocated GPB value per frame in addition to the average timeshare value described above. Since GPB can be allocated and not used, the unallocated GPB is typically smaller than the typical average actually available GPB. This number is used to give a "worst case" computed frame rate as follows:

current timeshare load = Average timeshare *

Average timeshare frames used proposed timeshare load = current timeshare load +

GPB Estimate of task computed worst case frames used = proposed timeshare load / unallocated GPB

The computation gives the frames used for timeshare execution, assuming all real-time tasks are using their allotted GPB.

When timeshare tasks are executing, it is necessary to pre-empt execution for real-time tasks which must be processed "on-time." This is accomplished in the currently preferred embodiment by interrupting timeshare execution to run real-time. In such a case, the context of the timeshare task is saved and then restored after real-time has completed.

If the context save and restore process takes a significant time to complete (e.g., saving the cache and reloading the cache in a cache-based processing system), this time should be taken into consideration when allocating real-time. This is the same overhead subtracted out from available timeshare processing, as described earlier. In particular, when the real-time task list completes, a check is made of the timer to determine whether there is enough time to restore and save the timeshare process before the end of the frame. If there is not enough time, timeshare processing is not restored for this frame. Thus, in a heavily loaded system, timeshare execution can drop to zero.

An example of an alternative technique for managing timeshare is to run timeshare modules only if the remaining processing time available in a given frame exceeds the required processing for the module (GPB Estimate and/or GPB Actual). In such a case, the timeshare module should complete execution prior to the end of the frame. Thus, no timeshare module should "straddle" a frame boundary. If this is done, the GPB Actual value is significant as in realtime. This technique eliminates context save/restore overhead but requires more processing for the executive function in the DSP Kernel. Also, error recovery capability must be provided, in case a timeshare module fails to complete execution prior to the frame boundary. Note that this technique requires that all modules run within a frame, which could make programming more difficult for long tasks (i.e., the programmer manually breaks up execution in chunks, rather than relying on the context switch process doing it automatically).

Thus, in a computer system having a digital signal processor for processing real-time tasks in a frame based system, an apparatus and method for ensuring that the task is executable within the frame such that the frame's total processing time is not exceeded if the task is processed within that frame, is disclosed.

CLAIMS

What is claimed is:

1. In a computer system having a digital signal processor for processing a task in real-time on a frame basis, a method for determining whether said task is executable within a particular frame such that a total processing time corresponding to said particular frame is not exceeded if said task is processed within said particular frame, comprising the steps of:

determining a processing time for said task;

calculating a time for executing a task list specifying at least one task to be processed during said frame;

calculating an amount of processing time available in said frame by subtracting said task list execution time from said frame's total processing time;

installing said task in said task list if said available processing time is at least as great as said task processing time, otherwise generating a signal indicating the task cannot be installed.

2. The method of Claim 1 wherein said task list execution time is determined by adding together processing times for each installed task in said task list.

3. The method of Claim 2 wherein each task is comprised of at least one module.

4. The method of Claim 3 wherein said processing time for an installed task is calculated by determining a worst-case utilization of said modules corresponding to said task and adding together each module's processing times for said worst-case utilization.

5. The method of Claim 4 wherein said module's processing time is calculated in reference to said module's type of algorithm, wherein:

if said module comprises a smooth algorithm, said module's processing time is an estimated processing time if an actual processing time has not been measured for said module, otherwise said module's processing time is comprised of the actual processing time;

if said module comprises a smart-lumpy algorithm, said module's processing time is comprised of the larger of said estimated processing time and actual processing time if said task's worst-case processing time situation has not yet occurred, otherwise said module's processing time is said actual processing time;

if said module comprises a dumb-lumpy algorithm, said module's processing time is the larger of said estimated processing time or actual processing time for said module.

6. The method of Claim 5 wherein said actual processing time for said module is measured by a timer.

7. The method of Claim 6 wherein said module's actual processing time measured by said timer includes related system activities.

8. The method of Claim 7 wherein said module's processing time measured by said timer is measured in reference to said signal processor instruction cycles.

9. The method of Claim 8 wherein if said module is processed in a subsequent frame, a comparison is made between said prior actual processing time and said subsequent actual processing time for said module, said actual processing time for said module is updated with the larger of these two values.

10. The method of Claim 9 wherein a plurality of scaling vectors corresponding to said active module are implemented, enabling said active module to function in different instantiations.

11. The method of Claim 10 wherein said scaling vectors include a frame rate, scale factor, and a processing bandwidth value.

12. The method of Claim 11 further comprising the step of implementing one or more scaling vectors corresponding to said module for calculating said processing time for said module, said scaling vectors including a frame rate, a scaling factor, and at least one memory access count(s) corresponding to at least one type of memory reference.

13. The method of Claim 11 further comprising the step of implementing one or more scaling vectors corresponding to said module for calculating said processing time for said module, wherein said processing time for said module is determined according to the formula mx + b, wherein m corresponds to an incremental amount of time for processing an input sample, b corresponds to overhead time for said computer system, and x corresponds to a number of samples to process, wherein said scaling vectors include a frame rate, a scaling factor, and values of m and b.

14. The method of Claim 11 wherein a processing allocation of said active module is varied dynamically, depending on said availability of processing time within said frame.

15. The method of Claim 14 further comprising the step of updating said actual processing time when said task is unloaded and storing said updated processing time in a storage means.

16. The method of Claim 15, wherein said updated processing time is retrieved and utilized in calculating said execution time of said task list.

17. In a computer system wherein tasks are processed in real-time on a frame basis, an apparatus for ensuring that a task can be completely processed within a frame such that said frame's available processing time is not exceeded, comprising:
   a task list for specifying tasks to be processed during said frame;
   a digital signal processor coupled to said computer system for executing said task list;
   an operating system coupled to said computer system which determines an available processing time for said frame by subtracting an execution time for executing said task list from a total processing time of said frame, wherein if said available processing time is at least as large as said processing time for said task, said task is included in said task list, otherwise said task is not included in said task list.

18. The apparatus of Claim 17 further comprises a scaling vector for calculating said task processing time, said scaling vector including a frame rate, a scale factor, and at least one memory access count corresponding to at least one type of memory reference.

19. The apparatus of Claim 17 further comprises a scaling vector for calculating said task processing time, said scaling vector including a frame rate, a scale factor, and values m and b, wherein said task processing time is determined according to the formula $mx + b$, wherein m corresponds to an incremental amount of time for processing an input sample, b corresponds to overhead time for said computer system, and x corresponds to a number of samples to process.

20. The apparatus of Claim 17 further comprising a first flag corresponding to each task in said task list, wherein the state of said first flag determines whether said corresponding task is active, wherein active tasks in said task list are processed during said frame when said task list is executed.

21. The apparatus of Claim 20 wherein said task list execution time is determined by adding together all processing times for each task which is installed in said task list.

22. The apparatus of Claim 21 wherein each task is further comprised of at least one module.

23. The apparatus of Claim 22 further comprising a second flag associated with said module, the state of said second flag determining whether said module's processing time is to be included in calculating said task's processing time, wherein said task's processing time is the sum of the total processing times for each module as determined by said second flag.

24. The apparatus of Claim 23 further comprising:
a first register associated with said module for storing said module's actually measured processing time;
a second register associated with said module for storing an estimated processing time for said module;
a third flag which determines whether said first register value represents the worst case of said module's processing time, wherein the state of said flags depends upon said module's algorithm.

25. The apparatus of Claim 24 wherein said module's algorithm includes one of three types: smooth, smart-lumpy, and dumb-lumpy.

26. The apparatus of Claim 25 further comprising a timer for determining said module's actual processing time including any related system activities.

27. The apparatus of Claim 26 wherein said timer determines said module's actual processing time in reference of an instruction cycle.

28. The apparatus of Claim 27 wherein each time said module is processed, said timer measures an actual processing time for said module, said first register is updated with said measured processing time if said measured processing time is larger than said first register's current value, otherwise said first register is not updated.

29. The apparatus of Claim 28 further comprising a plurality of scaling vectors associated with said module, enabling said module to perform its function in a plurality of instantiations.

30. The apparatus of Claim 29 wherein said scaling vectors include a frame rate, scale factor, and processing value.

31. The apparatus of Claim 30, wherein said estimated processing time of said module is derived from said scaling vector.

32. The apparatus of Claim 30 wherein said module's processing allocation is varied dynamically, depending on said availability of processing time within said frame.

33. The apparatus of Claim 32 further comprising a storage means for storing updated processing times.

34. The apparatus of Claim 33 further comprises a means for calculating said execution time of said task list based on said updated processing times in said storage means.

35. In a frame-based computer system having a digital signal processor for processing a task on a timeshare basis, a method for determining whether said task can properly be serviced on said timeshare basis, comprising the steps of:

determining a processing time for said task, said task comprising at least one module, said processing time for said task is calculated by determining a worst-case utilization of said task's modules and adding together each module's processing times corresponding to said worst-case situation;

determining an amount of processing time which is available for timeshare processing per frame, determining the frequency that timeshare tasks are currently being executed, computing frequency of execution of timeshare tasks with said task also installed; and comparing said processing frequency for said task with required task frequency.

ABSTRACT

In a computer system having a digital signal processor for processing tasks in real-time within a series of frames, a method is described for determining whether there is enough processing time available within each frame to process the task such that the frame's total processing time is not exceeded. First, the task's processing time requirement is determined. The time for executing the current task list is then calculated. Next, the remaining amount of processing time available in the frame is determined. This is accomplished by subtracting the current task list execution time from the frame's total processing time. The new task is installed in the task list if the frame's available processing time is at least as great as the task's required processing time. Otherwise, the task is not installed in the task list and an error indication is generated.

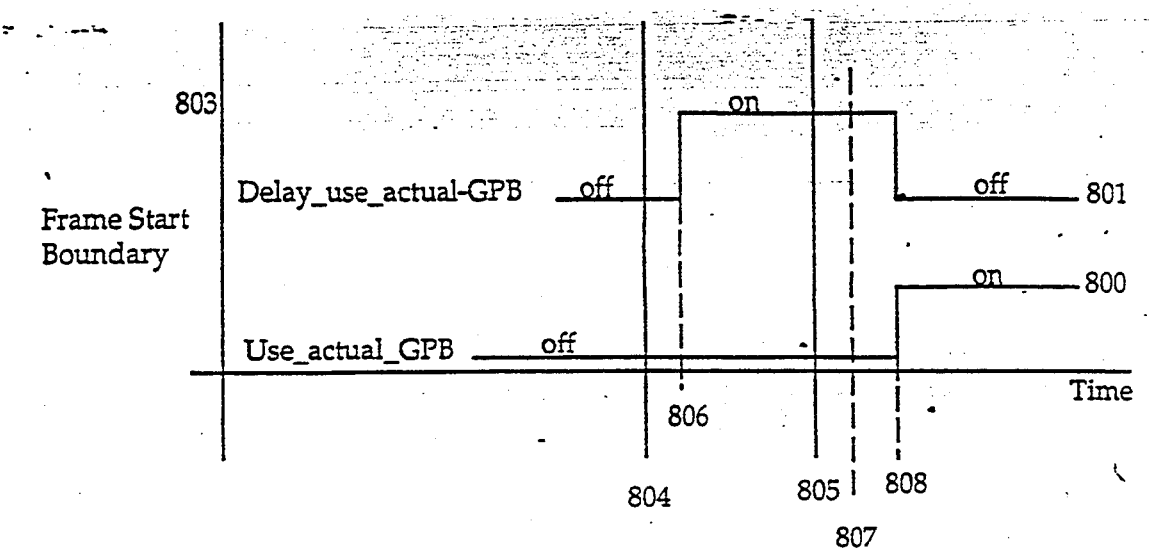

Figure 8

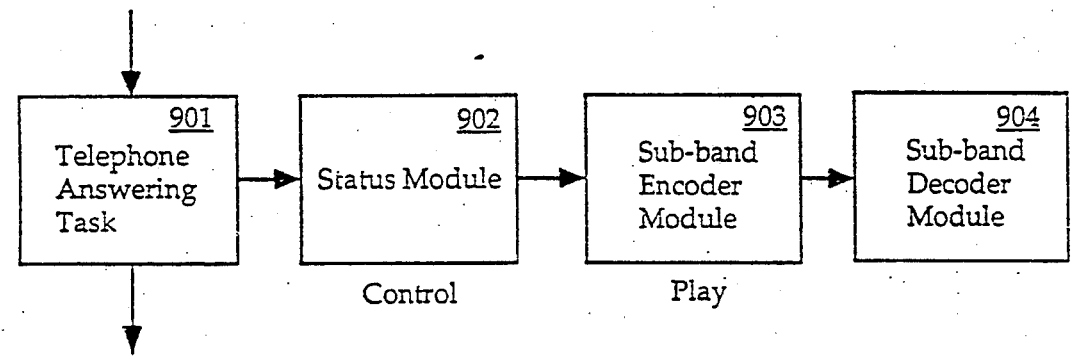

Figure 9

What is claimed is:

1. A computer-implemented method of executing a first task, said first task including a plurality of subtasks, the method comprising the steps of:

A) identifying a first task record,
 wherein the first task record has an identifier that identifies said first task,
 wherein the first task record is linked to a first module record of a plurality of module records,
 wherein the plurality of module records are sequentially linked to each other in a list that begins with said first module record and ends with a last module record, wherein each module record of said plurality of module records is linked to a corresponding code module of a plurality of code modules, wherein each code module of said plurality of code modules contains a set of executable functions which implement a subtask of said plurality of subtasks;

B) establishing said first module record as a current module record by following a link from said first task record to said first module record;

C) identifying a current code module of said plurality of code modules that corresponds to said current module record by following a link from said current module record;

D) executing said set of executable functions contained in the current code module; and E) if said current module record is not said last module record, then E1) established a next module record of said plurality of module records as said current module record by following a link from said current module record, and E2) repeating steps C) through E).

2. The method of claim 1 wherein said current module record includes a skipcount field for storing a skipcount value, wherein the step of E1) establishing a next module record as said current module record includes the step of skipping a number of module records in said list based on said skipcount value.

3. The method of claim 2 further comprising the step of terminating said first task if said skipcount value is equal to a predetermined value.

4. The method of claim 2 wherein performance of said step of D) executing said set of executable functions contained in the current code module changes said skipcount value.

5. The method of claim 1 wherein:

resources are required to perform said step of D) executing said set of executable functions contained in the current code module;

the current module record is linked by one or more links to the resources required to perform said step of D) executing said set of executable functions contained in the current code module; and the method further includes the step of following said one or more links from the current module record to said resources.

6. The method of claim 5 wherein the step of following said one or more links from the current module record to said resources includes following a link from the current module record to buffers required to perform said step of D) executing said set of executable functions contained in the current code module.

7. The method of claim 5 wherein the step of following said one or more links from the current module record to said resources includes following a link from the current module record to variables required to perform said step of D) executing said set of executable functions contained in the current code module.

8. The method of claim 5 wherein the step of following said one or more links from the current module record to said resources includes following a link from the current module record to tables required to perform said step of D) executing said set of executable functions contained in the current code module.

9. The method of claim 5 wherein the step of following said one or more links from the current module record to said resources includes following a link from the current module record to primary and secondary containers required to perform said step of D) executing said set of executable functions contained in the current code module.

10. The method of claim 5 wherein the step of following said one or more links from the current module record to said resources includes following a link from the current module record to buffer interconnections between the current module record and a next module record of said plurality of module records.

11. The method of claim 10 wherein the method includes the steps of:

a) loading a context associated with said set of executable functions contained in the current code module prior to executing said set of executable functions contained in the current code module; and b) saving said context after executing said set of executable functions contained in the current code module.

12. The method of claim 1 further including the step of linking each given module record of said plurality of module records to resources required by the set of executable functions contained in the corresponding code module of said given module record.

13. The method of claim 12 wherein the step of linking each given module record of said plurality of module records to resources required by the set of executable functions contained in the corresponding code module of said given module record includes the step of linking each given module record of said plurality of module records to buffer interconnections between a previous subtask of said plurality of subtasks and a next subtask of said plurality of subtasks.

14. The method of claim 1 wherein said first task record includes a link to a second task record associated with a second task, wherein the method includes the steps of:

after execution of said first task following said link from said first task record to said second task record, and executing said second task.

15. The method of claim 1 wherein said first module record includes buffer interconnections with a second module record and said second module record includes buffer interconnections with said first module record.

16. A method for constructing within a computer system a structure for a task that includes a plurality of subtasks, the method comprising the steps of:

A) constructing a plurality of module records by performing the following steps for each given subtask of said plurality of subtasks A1) identifying executable code which implements said given subtask;

A2) constructing a code module section that points to said executable code;

A3) identifying resources required to execute said executable code;

A4) constructing a plurality of additional module sections that point to said resources required to execute said executable code;

A5) constructing a module record for said given subtask, wherein said module record includes said module section and said plurality of additional module sections;

B) linking said plurality of module records to form a linked list of module records, said linked list of module records beginning with a first module record and ending with a last module record;

C) constructing a task record, said task record including an identifier that identifies said task;

D) linking said task record to said first module record in said linked list of module records.

17. The method of claim 16 wherein the step of A4) constructing a module record for said given subtask includes the steps of:

creating a module header;

storing a first value in said module header to indicate how many module sections are in said module record;

storing a second value in said module header to indicate which module section within said module record is said code module section;

storing said module header in said module record;

storing said code module section in said module record; and storing said plurality of additional module sections in said module record.

18. A method for constructing a task list within a computer system, wherein the task list includes a plurality of task structures corresponding to a plurality of tasks, wherein each task of said plurality of tasks includes one or more subtasks, the method comprising the steps of:

A) constructing said plurality of task structures by performing the following steps for each given task of said plurality of tasks A1) constructing one or more module records by performing the following steps for each given subtask of said one or more subtasks a) identifying executable code which implements said given subtask;

b) constructing a code module section that points to said executable code;

c) identifying resources required to execute said executable code;

d) constructing a plurality of additional module sections that point to said resources required to execute said executable code;

e) constructing a module record for said given subtask, wherein said module record includes said module section and said plurality of additional module sections;

A2) if said one or more module records include more than one module record, then linking said one or more module records to form a linked list of module records, said linked list of module records beginning with a first module record and ending with a last module record;

A3) constructing a task record, said task record including an identifier that identifies said given task;

A4) if said one or more module records include more than one module record, then linking said task record to said first module record in said linked list of module records;

A5) if said one or more module records include a single module record, then linking said task record to said single module record; and B) linking said plurality of task structures to form said task list.

* * * * *